United States Patent
Wang et al.

(10) Patent No.: US 11,668,907 B2
(45) Date of Patent: Jun. 6, 2023

(54) PHOTOGRAPHING OPTICAL LENS ASSEMBLY AND ELECTRONIC DEVICE

(71) Applicant: LARGAN PRECISION CO., LTD., Taichung (TW)

(72) Inventors: Kuo-Jui Wang, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 535 days.

(21) Appl. No.: 16/779,427

(22) Filed: Jan. 31, 2020

(65) Prior Publication Data
US 2021/0165189 A1 Jun. 3, 2021

(30) Foreign Application Priority Data
Nov. 29, 2019 (TW) .................. 108143770

(51) Int. Cl.
G02B 13/00 (2006.01)
G02B 9/62 (2006.01)

(52) U.S. Cl.
CPC .......... *G02B 13/0045* (2013.01); *G02B 9/62* (2013.01)

(58) Field of Classification Search
CPC .... G02B 13/0045; G02B 13/15; G02B 13/00; G02B 13/18; G02B 9/62; G02B 9/64; G02B 9/60; G02B 27/0012; G02B 27/646; G02B 3/04
USPC ........ 359/713, 658, 756, 757, 758, 761, 762
See application file for complete search history.

(56) References Cited

U.S. PATENT DOCUMENTS

| 3,388,956 A | 6/1968 | Eggert et al. |
| 4,124,276 A | 11/1978 | Okano et al. |
| 4,726,668 A | 2/1988 | Nakayama et al. |
| 9,488,808 B1 | 11/2016 | Chen et al. |
| 9,726,857 B2 | 8/2017 | Chen |
| 9,726,858 B2 | 8/2017 | Huang |

(Continued)

FOREIGN PATENT DOCUMENTS

| CN | 105807409 A | 7/2016 |
| CN | 106990511 A | 7/2017 |

(Continued)

OTHER PUBLICATIONS

CN Office Action in Application No. 201911266242.4 dated Oct. 21, 2021.

*Primary Examiner* — Travis S Fissel
(74) *Attorney, Agent, or Firm* — Maschoff Brennan

(57) ABSTRACT

A photographing optical lens assembly includes six lens elements which are, in order from an object side to an image side: a first lens element, a second lens element, a third lens element, a fourth lens element, a fifth lens element and a sixth lens element. Each of the six lens elements has an object-side surface facing toward the object side and an image-side surface facing toward the image side. The first lens element has positive refractive power. The second lens element has negative refractive power. The third lens element has negative refractive power. The fourth lens element has negative refractive power. The fifth lens element has positive refractive power. The sixth lens element has negative refractive power. An axial distance between the fourth lens element and the fifth lens element is larger than an axial distance between the fifth lens element and the sixth lens element.

26 Claims, 26 Drawing Sheets

(56) References Cited

U.S. PATENT DOCUMENTS

| | | | |
|---|---|---|---|
| 2016/0381289 A1* | 12/2016 | Kim | ........................ G06T 7/292 |
| | | | 348/38 |
| 2019/0086640 A1 | 3/2019 | Fukaya | |
| 2020/0041766 A1* | 2/2020 | Chen | ........................ G02B 9/62 |
| 2020/0209590 A1 | 7/2020 | Sun | |
| 2021/0055509 A1 | 2/2021 | Kamada et al. | |

FOREIGN PATENT DOCUMENTS

| | | | | |
|---|---|---|---|---|
| CN | 206757166 U | | 12/2017 | |
| CN | 206960765 U | | 2/2018 | |
| CN | 107783260 A | | 3/2018 | |
| CN | 108152934 A | | 6/2018 | |
| CN | 108375823 A | | 8/2018 | |
| CN | 108431663 A | | 8/2018 | |
| CN | 105807409 B | * | 9/2018 | ............ G02B 13/00 |
| CN | 108732721 A | | 11/2018 | |
| CN | 109164560 A | | 1/2019 | |
| CN | 109581627 A | | 4/2019 | |
| CN | 110196485 A | | 9/2019 | |
| CN | 110244438 A | | 9/2019 | |
| CN | 110426817 A | | 11/2019 | |
| JP | 1977-076921 A | | 6/1977 | |
| JP | H08-166539 A | | 6/1996 | |
| TW | 201624045 A | | 7/2016 | |
| TW | M546516 U | | 8/2017 | |
| WO | 2018098632 A1 | | 6/2018 | |
| WO | 2018223616 A1 | | 12/2018 | |
| WO | 2019-205789 A1 | | 10/2019 | |

\* cited by examiner

US 11,668,907 B2

PHOTOGRAPHING OPTICAL LENS ASSEMBLY AND ELECTRONIC DEVICE

RELATED APPLICATIONS

This application claims priority to Taiwan Application 108143770, filed on Nov. 29, 2019, which is incorporated by reference herein in its entirety.

BACKGROUND

Technical Field

The present disclosure relates to a photographing optical lens assembly and an electronic device, more particularly to a photographing optical lens assembly applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The third lens element has negative refractive power. The fourth lens element has negative refractive power. The fifth lens element has positive refractive power. The sixth lens element has negative refractive power. An axial distance between the fourth lens element and the fifth lens element is larger than an axial distance between the fifth lens element and the sixth lens element.

When half of a maximum field of view of the photographing optical lens assembly is HFOV, a focal length of the photographing optical lens assembly is f, a focal length of the third lens element is f3, a focal length of the fourth lens element is f4, a focal length of the fifth lens element is f5, a focal length of the sixth lens element is f6, the axial distance between the fifth lens element and the sixth lens element is T56, and a central thickness of the sixth lens element is CT6, the following conditions are satisfied:

$$5.0[\text{deg.}]<HFOV<25.0[\text{deg.}];$$

$$-4.0<f/f4<-0.05;$$

$$3.0<|f/f3|+|f/f4|+|f/f5|+|f/f6|<8.0; \text{ and}$$

$$0<T56/CT6<0.62.$$

According to another aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The third lens element has negative refractive power. The fourth lens element has negative refractive power. The fifth lens element has positive refractive power. The sixth lens element has negative refractive power, the object-side surface of the sixth lens element is concave in a paraxial region thereof, the image-side surface of the sixth lens element is convex in a paraxial region thereof, and the sixth lens element is made of plastic material. At least one surface of at least one lens element of the photographing optical lens assembly has at least one inflection point. An axial distance between the fourth lens element and the fifth lens element is larger than an axial distance between the fifth lens element and the sixth lens element.

When half of a maximum field of view of the photographing optical lens assembly is HFOV, a focal length of the photographing optical lens assembly is f, and a focal length of the fourth lens element is f4, the following conditions are satisfied:

$$5.0[\text{deg.}]<HFOV<25.0[\text{deg.}]; \text{ and}$$

$$-3.0<f/f4<-0.80.$$

According to another aspect of the present disclosure, a photographing optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The third lens element has negative refractive power. The fourth lens element has negative refractive power. The fifth lens element has positive refractive power, the object-side surface of the fifth lens element is concave in a paraxial region thereof, and the image-side surface of the fifth lens element is convex in a paraxial region thereof. The sixth lens element has negative refractive power. An axial distance between the fourth lens element and the fifth lens element is larger than an axial distance between the fifth lens element and the sixth lens element.

When half of a maximum field of view of the photographing optical lens assembly is HFOV, a focal length of the photographing optical lens assembly is f, and a focal length of the fourth lens element is f4, the following conditions are satisfied:

$$5.0[\text{deg.}]<HFOV<25.0[\text{deg.}]; \text{ and}$$

$$-4.0<f/f4<-0.50.$$

According to another aspect of the present disclosure, an electronic device includes at least two image capturing units disposed on the same side of the electronic device. The at least two image capturing units includes a first image capturing unit and a second image capturing unit. The first image capturing unit includes one of the aforementioned photographing optical lens assemblies and an image sensor disposed on an image surface of the photographing optical lens assembly. The second image capturing unit includes an optical lens assembly and an image sensor disposed on an image surface of the optical lens assembly. A maximum field of view of the first image capturing unit and a maximum field of view of the second image capturing unit differ by at least 35 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
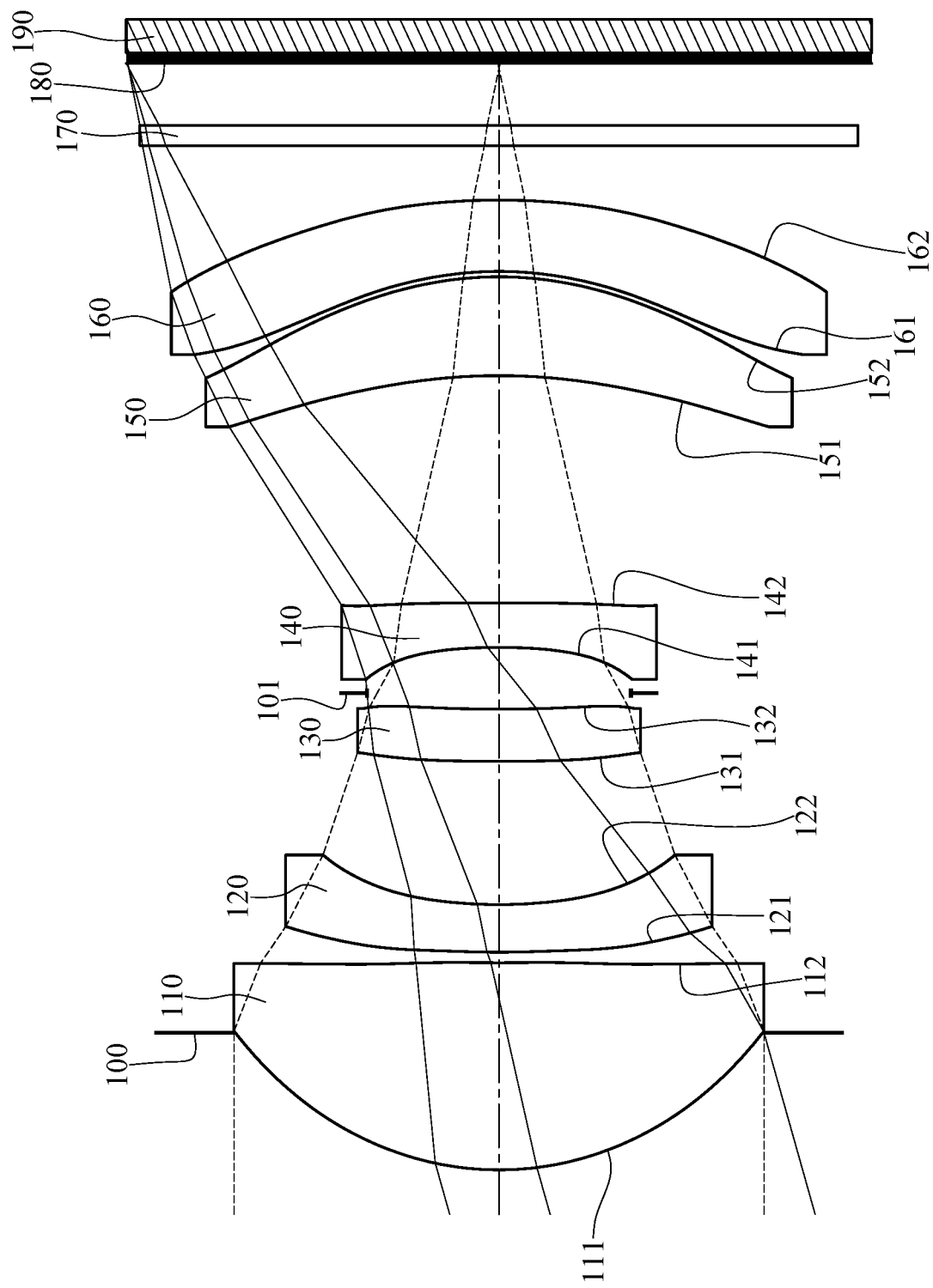
FIG. 1 is a schematic view of an image capturing unit according to the 1st embodiment of the present disclosure.

A photographing optical lens assembly includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

There can be an air gap in a paraxial region between each of all adjacent lens elements of the six lens elements; that is, each of the first through sixth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment which is not favorable for the image quality. Therefore, having an air gap in a paraxial region between each of all adjacent lens elements of the photographing optical lens assembly in the present disclosure is favorable for preventing the problem of the cemented lens elements so as to improve the yield rate and to increase flexibility in designing the surface shapes of lens elements, thereby reducing the size of the photographing optical lens assembly and correcting aberrations.

The first lens element has positive refractive power. Therefore, it is favorable for providing significant light converging capability so as to control the size of the photographing optical lens assembly.

The second lens element has negative refractive power. Therefore, it is favorable for correcting spherical and chromatic aberrations generated by the first lens element while reducing the incident angle. The object-side surface of the second lens element can be convex in a paraxial region thereof, and the image-side surface of the second lens element can be concave in a paraxial region thereof. Therefore, it is favorable for correcting astigmatism.

The third lens element has negative refractive power. Therefore, it is favorable for effectively dispersing the refractive power of the photographing optical lens assembly so as to prevent overly strong refractive power from any single lens element. The object-side surface of the third lens element can be convex in a paraxial region thereof, and the image-side surface of the third lens element can be concave in a paraxial region thereof. Therefore, it is favorable for correcting spherical aberration and coma.

The fourth lens element has negative refractive power. Therefore, it is favorable for properly balancing between a telephoto structure and a short back focal length so as to achieve a miniaturized telephoto configuration. The object-side surface of the fourth lens element can be concave in a paraxial region thereof. Therefore, it is favorable for preventing a total reflection due to an overly large incident angle on surfaces of the fourth lens element.

The fifth lens element has positive refractive power. Therefore, it is favorable for reducing the angle between the light path and the optical axis in the photographing optical lens assembly so as to reduce the incident angle on the image surface. The object-side surface of the fifth lens element can be concave in a paraxial region thereof, and the image-side surface of the fifth lens element can be convex in a paraxial region thereof. Therefore, it is favorable for correcting distortion so as to prevent deformation of the peripheral image.

The sixth lens element has negative refractive power. Therefore, it is favorable for reducing the back focal length so as to achieve miniaturization. The object-side surface of the sixth lens element can be concave in a paraxial region thereof, and the image-side surface of the sixth lens element can be convex in a paraxial region thereof. Therefore, it is favorable for controlling the incident angle on the image surface so as to improve brightness at the image periphery. The sixth lens element can be made of plastic material. Therefore, it is favorable for increasing the design flexibility of the surface shape of the sixth lens element so as to improve lens manufacturing and aberration corrections.

An axial distance between the fourth lens element and the fifth lens element is larger than an axial distance between the fifth lens element and the sixth lens element. Therefore, it is favorable for balancing the distances between each of all adjacent lens elements on the image side so as to meet the requirement of miniaturization. Moreover, the axial distance between the fourth lens element and the fifth lens element can be a maximum among axial distances between each of all adjacent lens elements of the photographing optical lens assembly. Therefore, it is favorable for achieving a telephoto feature in a miniaturized space.

Figure 26:
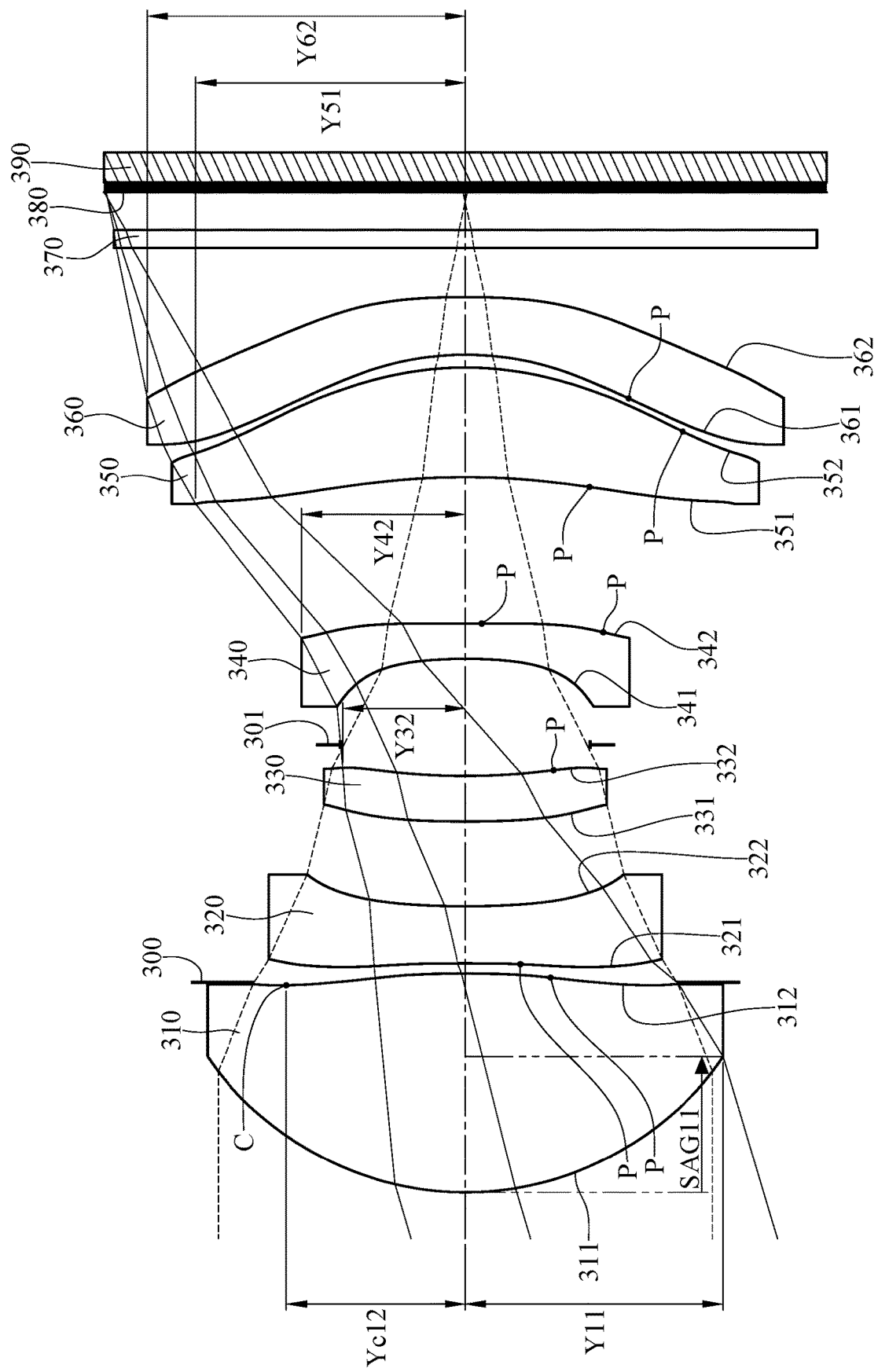
FIG. 26 shows a schematic view of Y11, Y32, Y42, Y51, Y62, Yc12 and SAG11, as well as several inflection points and critical points of the lens elements according to the 3rd embodiment of the present disclosure.

According to the present disclosure, at least one of the object-side surface and the image-side surface of at least one lens element of the photographing optical lens assembly can have at least one inflection point. Therefore, it is favorable for correcting aberrations so as to improve image quality and miniaturization. Moreover, the object-side surface of the sixth lens element can have at least one inflection point. Therefore, it is favorable for effectively reducing the back focal length so as to control the total track length. Please refer to FIG. 26, which shows a schematic view of several inflection points P of lens elements according to the 3rd embodiment of the present disclosure. The inflection points on the image-side surface of the first lens element, the object-side surface of the second lens element, the image-side surface of the third lens element, the image-side surface of the fourth lens element, the object-side surface and image-side surface of the fifth lens element and the object-side surface of the sixth lens element in FIG. 26 are only exemplary. The abovementioned surfaces each may have more than one inflection points, and the other surfaces of the six lens elements each may also have one or more inflection points.

When half of a maximum field of view of the photographing optical lens assembly is HFOV, the following condition is satisfied: 5.0 [deg.]<HFOV<25.0 [deg.]. Therefore, it is favorable for imaging objects from afar with increased resolution of partial image, thereby achieving telephoto effect. Moreover, the following condition can also be satisfied: 5.0 [deg.]<HFOV<20.0 [deg.]. When a focal length of the photographing optical lens assembly is f, and a focal length of the fourth lens element is f4, the following condition is satisfied: −4.0<f/f4<−0.05. Therefore, it is favorable for having one lens element with sufficient divergence power in the middle part of the photographing optical lens assembly so as to balance the telephoto feature and improve the symmetry of the photographing optical lens assembly. Moreover, the following condition can also be satisfied: −4.0<f/f4<−0.50. Moreover, the following condition can also be satisfied: −3.0<f/f4<−0.80. Moreover, the following condition can also be satisfied: −2.50<f/f4<−0.80. Moreover, the following condition can also be satisfied: −2.0<f/f4<−1.0.

When the focal length of the photographing optical lens assembly is f, a focal length of the third lens element is f3, the focal length of the fourth lens element is f4, a focal length of the fifth lens element is f5, and a focal length of the sixth lens element is f6, the following condition can be satisfied: 3.0<|f/f3|+|f/f4|+|f/f5|+|f/f6|<8.0. Therefore, it if favorable for effectively controlling the light path with sufficient refractive power and for imaging detailed images of smaller objects from afar. Moreover, the following condition can also be satisfied: 3.0<|f/f3|+|f/f4|+|f/f5|+|f/f6|<6.5. Moreover, the following condition can also be satisfied: 3.0<|f/f3|+|f/f4|+|f/f5|+|f/f6|<5.5.

When the axial distance between the fifth lens element and the sixth lens element is T56, and a central thickness of the sixth lens element is CT6, the following condition can be satisfied: 0<T56/CT6<0.62. Therefore, it is favorable for balancing the lens thicknesses and the axial distance between the fifth lens element and the sixth lens element, such that the fifth and sixth lens elements are configured as complementary lens elements for correcting aberrations. Moreover, the following condition can also be satisfied: 0<T56/CT6<0.30.

When a focal length of the second lens element is f2, and the focal length of the fourth lens element is f4, the following condition can be satisfied: 0.95<|f2/f4|<3.0. Therefore, it is favorable for controlling the light path by the fourth lens element so as to achieve a telephoto feature. Moreover, the following condition can also be satisfied: 1.0<|f2/f4|<2.5.

When an axial distance between the object-side surface of the first lens element and the image surface is TL, and the focal length of the photographing optical lens assembly is f, the following condition can be satisfied: 0.30<TL/f<0.90. Therefore, it is favorable for diverse applications by balancing the total track length and field of view of the photographing optical lens assembly.

When a curvature radius of the object-side surface of the fourth lens element is R7, and a curvature radius of the image-side surface of the fourth lens element is R8, the following condition can be satisfied: −1.50<(R7+R8)/(R7−R8)<1.0. Therefore, it is favorable for improving the shape symmetry of the fourth lens element so as to enhance image quality. Moreover, the following condition can also be satisfied: −1.50<(R7+R8)/(R7−R8)<0.80.

When a curvature radius of the object-side surface of the sixth lens element is R11, and a curvature radius of the image-side surface of the sixth lens element is R12, the following condition can be satisfied: −5.0<(R11+R12)/(R11−R12)<−2.0. Therefore, it is favorable for configuring the sixth lens element as a correction lens so as to improve image quality.

When a maximum effective radius of the object-side surface of the first lens element is Y11, and a maximum effective radius of the image-side surface of the third lens element is Y32, the following condition can be satisfied: 1.50<Y11/Y32<2.50. Therefore, it is favorable for controlling the light path on the object side of the photographing optical lens assembly so as to achieve a miniaturized telephoto configuration. Please refer to FIG. 26, which shows a schematic view of Y11 and Y32 according to the 3rd embodiment of the present disclosure.

When a maximum effective radius of the image-side surface of the fourth lens element is Y42, and a maximum effective radius of the object-side surface of the fifth lens element is Y51, the following condition can be satisfied: 1.40<Y51/Y42<2.0. Therefore, it is favorable for controlling the slope of light path between the fourth and fifth lens elements so as to have a sufficient image size while being miniaturized. Please refer to FIG. 26, which shows a schematic view of Y42 and Y51 according to the 3rd embodiment of the present disclosure.

When an Abbe number of the fifth lens element is V5, and an Abbe number of the sixth lens element is V6, the following condition can be satisfied: 0.10<V5/V6<0.55. Therefore, it is favorable for improving the refractive capability of the fifth lens element so as to effectively reduce the total track length. Moreover, the following condition can also be satisfied: 0.10<V5/V6<0.40.

When an f-number of the photographing optical lens assembly is Fno, the following condition can be satisfied: 1.0<Fno<2.50. Therefore, it is favorable for adjusting the entrance pupil diameter so as to provide sufficient incident light, thereby increasing image brightness. Moreover, the following condition can also be satisfied: 1.20<Fno<2.20.

When a minimum value among Abbe numbers of all lens elements of the photographing optical lens assembly is Vdmin, the following condition can be satisfied: 10.0<Vdmin<21.0. Therefore, it is favorable for improving the control capability and increasing the design flexibility of lens elements so as to satisfy high-end product specifications. Moreover, the following condition can also be satisfied: 12.0<Vdmin<20.0. Moreover, the following condition can also be satisfied: 13.0<Vdmin<19.0.

When a maximum image height of the photographing optical lens assembly (half of a diagonal length of an effective photosensitive area of the image sensor) is ImgH, and the focal length of the photographing optical lens assembly is f, the following condition can be satisfied: 0.15<ImgH/f<0.33. Therefore, it is favorable for providing a better view angle for various applications.

When a central thickness of the first lens element is CT1, and a displacement in parallel with the optical axis from an axial vertex to a maximum effective radius position on the object-side surface of the first lens element is SAG11, the following condition can be satisfied: 0.50<CT1/|SAG11|<1.80. Therefore, it is favorable for controlling the shape of the object-side surface of the first lens element so as to achieve a telephoto configuration. Furthermore, SAG11 is a directional displacement. When the displacement from the axial vertex to the maximum effective radius position on one lens surface is facing towards the image side of the photographing optical lens assembly, the value of displacement is positive; when the displacement from the axial vertex to the maximum effective radius position on one lens surface is facing towards the object side of the photographing optical lens assembly, the value of displacement is negative. Please refer to FIG. 26, which shows a schematic view of SAG11 according to the 3rd embodiment of the present disclosure.

When the focal length of the photographing optical lens assembly is f, and the curvature radius of the image-side surface of the sixth lens element is R12, the following condition can be satisfied: −3.0<f/R12<−1.10. Therefore, it is favorable for improving the symmetry of the surface shapes between the object side and image side of the photographing optical lens assembly so as to reduce aberrations.

When a curvature radius of the image-side surface of the fifth lens element is R10, and the curvature radius of the object-side surface of the sixth lens element is R11, the following condition can be satisfied: −0.15<(R10−R11)/(R10+R11)<0.15. Therefore, it is favorable for configuring the image-side surface of the fifth lens element and the object-side surface of the sixth lens element so as to balance aberration corrections, thereby improving image quality.

When an entrance pupil diameter of the photographing optical lens assembly is EPD, and the maximum image height of the photographing optical lens assembly is ImgH, the following condition can be satisfied: 1.0<EPD/ImgH<3.0. Therefore, it is favorable for increasing the light receiving area so as to improve peripheral image brightness. Moreover, the following condition can also be satisfied: 1.2<EPD/ImgH<2.0.

When an axial distance between the third lens element and the fourth lens element is T34, and the axial distance between the fourth lens element and the fifth lens element is T45, the following condition can be satisfied: 1.0<T45/T34<7.0. Therefore, it is favorable for balancing the lens spacing from the third through fifth lens elements so as to reduce the manufacturing sensitivity. Moreover, the following condition can also be satisfied: 2.0<T45/T34<5.5.

When the maximum effective radius of the object-side surface of the first lens element is Y11, and a maximum effective radius of the image-side surface of the sixth lens element is Y62, the following condition can be satisfied: 0.70<Y11/Y62<1.20. Therefore, it is favorable for having similar aperture diameters on the object and image sides so as to increase the symmetry of the photographing optical lens assembly. Please refer to FIG. 26, which shows a schematic view of Y11 and Y62 according to the 3rd embodiment of the present disclosure.

When a vertical distance between a non-axial critical point closest to the optical axis on the image-side surface of the first lens element and the optical axis is Yc12, and the central thickness of the first lens element is CT1, the following condition can be satisfied: 0.03<Yc12/CT1<2.0. Therefore, it is favorable for correcting off-axis aberrations and effectively reducing the total track length. Please refer to FIG. 26, which shows a schematic view of a critical point C of the image-side surface 312 of the first lens element 310, as well as Yc12 according to the 3rd embodiment of the present disclosure. The critical point on the image-side surface of the first lens element in FIG. 26 is only exemplary. The other surfaces of the six lens elements may also have one or more critical points.

When an axial distance between the second lens element and the third lens element is T23, the axial distance between the third lens element and the fourth lens element is T34, and the axial distance between the fourth lens element and the fifth lens element is T45, the following condition can be satisfied: 0.20<(T23−T34)/T45<1.20. Therefore, it is favorable for balancing the axial distances between adjacent lens elements so as to increase lens assembling yield rate. Moreover, the following condition can also be satisfied: 0.30<(T23−T34)/T45<1.0.

The central thickness of the first lens element can be a maximum among central thicknesses of all lens elements of the photographing optical lens assembly. Therefore, it is favorable for enhancing the mechanical strength of the object side of the photographing optical lens assembly with higher applicability in various environments.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible, and the influence on imaging caused by external environment temperature change may be reduced.

The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the photographing optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
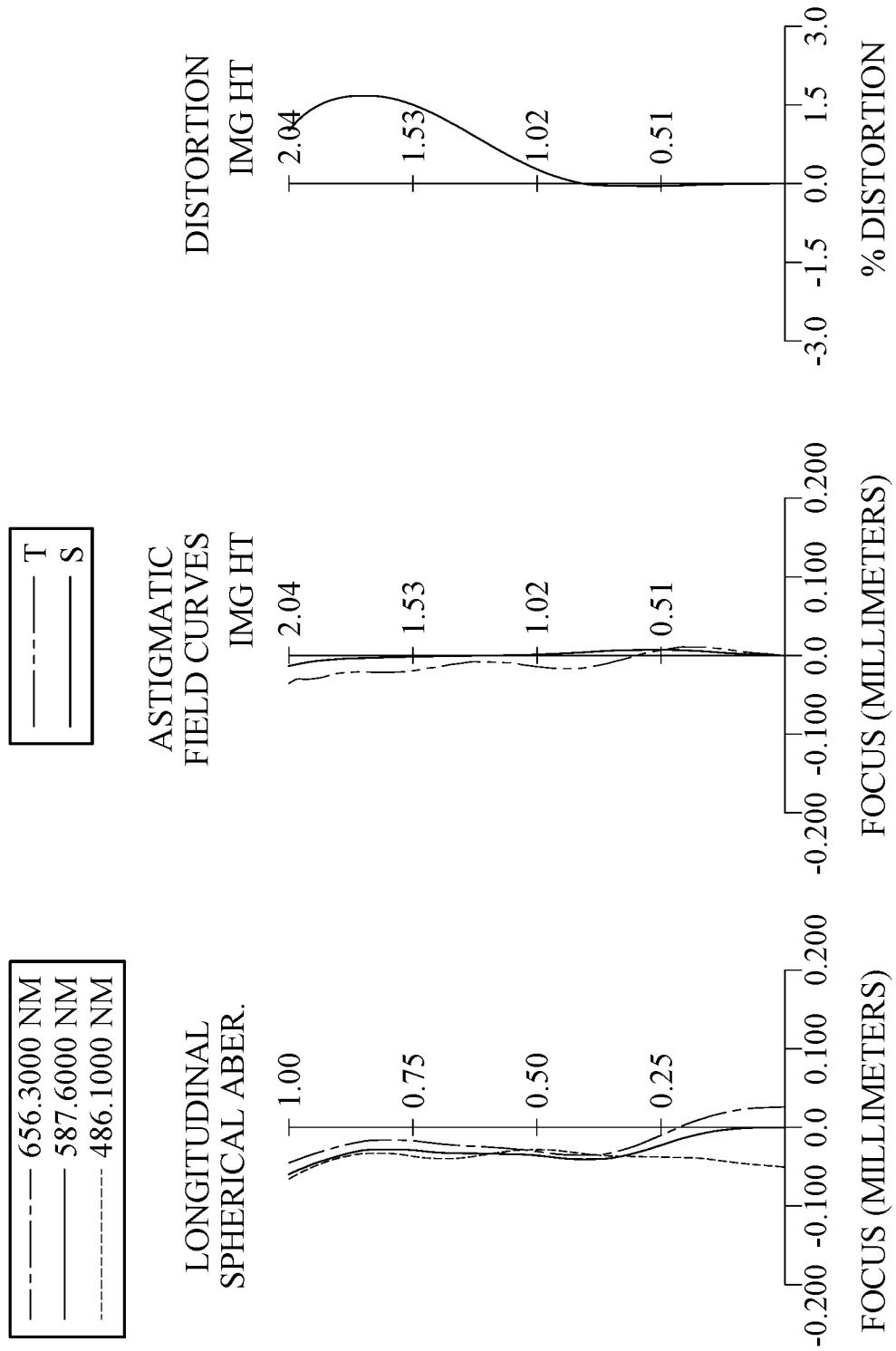
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, an aperture stop 100, a first lens element 110, a second lens element 120, a third lens element 130, a stop 101, a fourth lens element 140, a fifth lens element 150, a sixth lens element 160, a filter 170 and an image surface 180. The photographing optical lens assembly includes six lens elements (110, 120, 130, 140, 150 and 160) with no additional lens element disposed between each of the adjacent six lens elements, wherein there is an air gap between each of all adjacent lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has at least one inflection point. The image-side surface 112 of the first lens element 110 has at least one critical point in an off-axis region thereof.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point. The image-side surface 132 of the third lens element 130 has at least one inflection point.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The image-side surface 142 of the fourth lens element 140 has at least one inflection point.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has at least one inflection point.

The filter 170 is made of glass material and located between the sixth lens element 160 and the image surface 180, and will not affect the focal length of the photographing optical lens assembly. The image sensor 190 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=7.22 millimeters (mm), Fno=2.48, HFOV=15.7 degrees (deg.).

When a minimum value among Abbe numbers of all lens elements of the photographing optical lens assembly is Vdmin, the following condition is satisfied: Vdmin=19.4. In this embodiment, among the six lens elements (110, 120, 130, 140, 150 and 160) of the photographing optical lens assembly, an Abbe number of the second lens element 120 and an Abbe number of the fifth lens element 150 are the same and are both smaller than Abbe numbers of the other lens elements, and Vdmin is equal to the Abbe number of the second lens element 120 and the Abbe number of the fifth lens element 150.

When the Abbe number of the fifth lens element 150 is V5, and an Abbe number of the sixth lens element 160 is V6, the following condition is satisfied: V5/V6=0.35.

When an axial distance between the third lens element 130 and the fourth lens element 140 is T34, and an axial distance between the fourth lens element 140 and the fifth lens element 150 is T45, the following condition is satisfied: T45/T34=3.68. In this embodiment, an axial distance between two adjacent lens elements is an air gap in a paraxial region between the two adjacent lens elements.

When an axial distance between the fifth lens element 150 and the sixth lens element 160 is T56, and a central thickness of the sixth lens element 160 is CT6, the following condition is satisfied: T56/CT6=0.08.

When an axial distance between the second lens element 120 and the third lens element 130 is T23, the axial distance between the third lens element 130 and the fourth lens element 140 is T34, and the axial distance between the fourth lens element 140 and the fifth lens element 150 is T45, the following condition is satisfied: (T23-T34)/T45=0.36.

When the focal length of the photographing optical lens assembly is f, and a curvature radius of the image-side surface 162 of the sixth lens element 160 is R12, the following condition is satisfied: f/R12=−1.90.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−1.16.

When a curvature radius of the image-side surface 152 of the fifth lens element 150 is R10, and a curvature radius of the object-side surface 161 of the sixth lens element 160 is R11, the following condition is satisfied: (R10−R11)/(R10+R11)=0.01.

When the curvature radius of the object-side surface 161 of the sixth lens element 160 is R11, and the curvature radius of the image-side surface 162 of the sixth lens element 160 is R12, the following condition is satisfied:

(R11+R12)/(R11−R12)=−3.05.

When the focal length of the photographing optical lens assembly is f, and a focal length of the fourth lens element 140 is f4, the following condition is satisfied: f/f4=−1.14.

When a focal length of the second lens element 120 is f2, and the focal length of the fourth lens element 140 is f4, the following condition is satisfied: |f2/f4|=1.43.

When the focal length of the photographing optical lens assembly is f, a focal length of the third lens element 130 is f3, the focal length of the fourth lens element 140 is f4, a focal length of the fifth lens element 150 is f5, and a focal length of the sixth lens element 160 is f6, the following condition is satisfied: |f/f3|+|f/f4|+|f/f5|+|f/f6|=3.45.

When an entrance pupil diameter of the photographing optical lens assembly is EPD, and a maximum image height of the photographing optical lens assembly is ImgH, the following condition is satisfied: EPD/ImgH=1.43.

When the maximum image height of the photographing optical lens assembly is ImgH, and the focal length of the photographing optical lens assembly is f, the following condition is satisfied: ImgH/f=0.28.

When an axial distance between the object-side surface 111 of the first lens element 110 and the image surface 180 is TL, and the focal length of the photographing optical lens assembly is f, the following condition is satisfied: TL/f=0.84.

When a central thickness of the first lens element 110 is CT1, and a displacement in parallel with the optical axis from an axial vertex to a maximum effective radius position on the object-side surface 111 of the first lens element 110 is SAG11, the following condition is satisfied: CT1/|SAG11|=1.49.

When a maximum effective radius of the object-side surface 111 of the first lens element 110 is Y11, and a maximum effective radius of the image-side surface 162 of the sixth lens element 160 is Y62, the following condition is satisfied: Y11/Y62=0.81.

When the maximum effective radius of the object-side surface 111 of the first lens element 110 is Y11, and a maximum effective radius of the image-side surface 132 of the third lens element 130 is Y32, the following condition is satisfied: Y11/Y32=1.97.

When a maximum effective radius of the image-side surface 142 of the fourth lens element 140 is Y42, and a maximum effective radius of the object-side surface 151 of the fifth lens element 150 is Y51, the following condition is satisfied: Y51/Y42=1.71.

The ratios of vertical distances between the critical points on the image-side surface 112 of the first lens element 110 and the optical axis to the central thickness of the first lens element 110 respectively have the following values: 0.21; 0.69; and 1.14. Moreover, when the vertical distance between the critical point closest to the optical axis on the image-side surface 112 of the first lens element 110 and the optical axis is Yc12, and the central thickness of the first lens element 110 is CT1, the following condition is satisfied: Yc12/CT1=0.21.

The detailed optical data of the 1st embodiment are shown in Table 1 and the aspheric surface data are shown in Table 2 below.

TABLE 1

1st Embodiment
f = 7.22 mm, Fno = 2.48, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.673 | (ASP) | 1.140 | Plastic | 1.545 | 56.1 | 3.39 |
| 3 | | 13.629 | (ASP) | 0.058 | | | | |
| 4 | Lens 2 | 5.151 | (ASP) | 0.262 | Plastic | 1.669 | 19.4 | −9.07 |
| 5 | | 2.730 | (ASP) | 0.789 | | | | |
| 6 | Lens 3 | 23.564 | (ASP) | 0.287 | Plastic | 1.534 | 55.9 | −32.63 |
| 7 | | 9.974 | (ASP) | 0.087 | | | | |
| 8 | Stop | Plano | | 0.252 | | | | |
| 9 | Lens 4 | −3.186 | (ASP) | 0.245 | Plastic | 1.544 | 56.0 | −6.34 |
| 10 | | −43.290 | (ASP) | 1.250 | | | | |
| 11 | Lens 5 | −3.315 | (ASP) | 0.544 | Plastic | 1.669 | 19.4 | 6.24 |
| 12 | | −1.970 | (ASP) | 0.030 | | | | |
| 13 | Lens 6 | −1.921 | (ASP) | 0.392 | Plastic | 1.544 | 56.0 | −7.71 |
| 14 | | −3.797 | (ASP) | 0.300 | | | | |
| 15 | Filter | Plano | | 0.110 | Glass | 1.517 | 64.2 | — |
| 16 | | Plano | | 0.342 | | | | |
| 17 | Image | Plano | | — | | | | |

Note:
Reference wavelength is 587.6 nm (d-line).
An effective radius of the stop 101 (Surface 8) is 0.725 mm.

TABLE 2

Aspheric Coefficients

| Surface # | 2 | 3 | 4 | 5 | 6 | 7 |
|---|---|---|---|---|---|---|
| k = | −3.7918E−01 | 5.0296E+01 | 3.1840E+00 | 4.6756E−01 | 9.0000E+01 | 7.2752E+01 |
| A4 = | 3.8702E−03 | −3.9780E−01 | −3.8483E−01 | −1.7687E−02 | 1.7399E−01 | 7.3739E−02 |
| A6 = | 5.8291E−04 | 1.0939E+00 | 1.2227E+00 | 3.8515E−01 | −1.6117E−01 | −1.5407E−01 |

TABLE 2-continued

Aspheric Coefficients

| A8 = | −8.2964E−03 | −1.4968E+00 | −1.5910E+00 | −3.1352E−01 | 2.7085E−01 | −5.6511E−01 |
|---|---|---|---|---|---|---|
| A10 = | 1.8783E−02 | 1.1657E+00 | 9.7074E−01 | −3.0164E−01 | −1.0074E+00 | 8.2256E−01 |
| A12 = | −1.5220E−02 | −5.2827E−01 | −1.9392E−01 | 5.9897E−01 | 1.7880E+00 | −4.9741E−01 |
| A14 = | 5.5569E−03 | 1.3053E−01 | −5.4070E−02 | −2.4256E−01 | −1.1915E+00 | — |
| A16 = | −7.7762E−04 | −1.3706E−02 | 2.1766E−02 | — | — | — |

| Surface # | 9 | 10 | 11 | 12 | 13 | 14 |
|---|---|---|---|---|---|---|
| k = | −6.3993E+00 | 9.0000E+01 | 4.4171E−01 | −2.3209E−02 | −2.3425E−03 | 2.2657E−01 |
| A4 = | −2.4224E−01 | −3.1918E−02 | −1.8991E−02 | 4.8245E−02 | 1.3779E−01 | 1.5925E−02 |
| A6 = | 3.7550E−01 | −2.0951E−01 | 1.4344E−01 | −6.7930E−02 | −3.6970E−01 | −1.4610E−01 |
| A8 = | −5.2490E+00 | 1.3413E+00 | −2.4120E−01 | 1.0068E−01 | 5.5968E−01 | 2.4392E−01 |
| A10 = | 2.4824E+01 | −6.0931E+00 | 2.1659E−01 | −7.8175E−02 | −4.3540E−01 | −2.0749E−01 |
| A12 = | −7.0154E+01 | 1.8408E+01 | −1.0826E−01 | 3.3738E−02 | 1.8996E−01 | 1.1013E−01 |
| A14 = | 1.1384E+02 | −3.3163E+01 | 2.5040E−02 | −7.3966E−03 | −4.3728E−02 | −3.8866E−02 |
| A16 = | −9.4508E+01 | 3.5236E+01 | 1.0960E−03 | 6.4498E−04 | 3.6328E−03 | 8.9504E−03 |
| A18 = | 3.0002E+01 | −2.0356E+01 | −1.7459E−03 | — | 3.4717E−04 | −1.2124E−03 |
| A20 = | — | 4.8759E+00 | 2.5076E−04 | — | −6.2357E−05 | 7.2469E−05 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
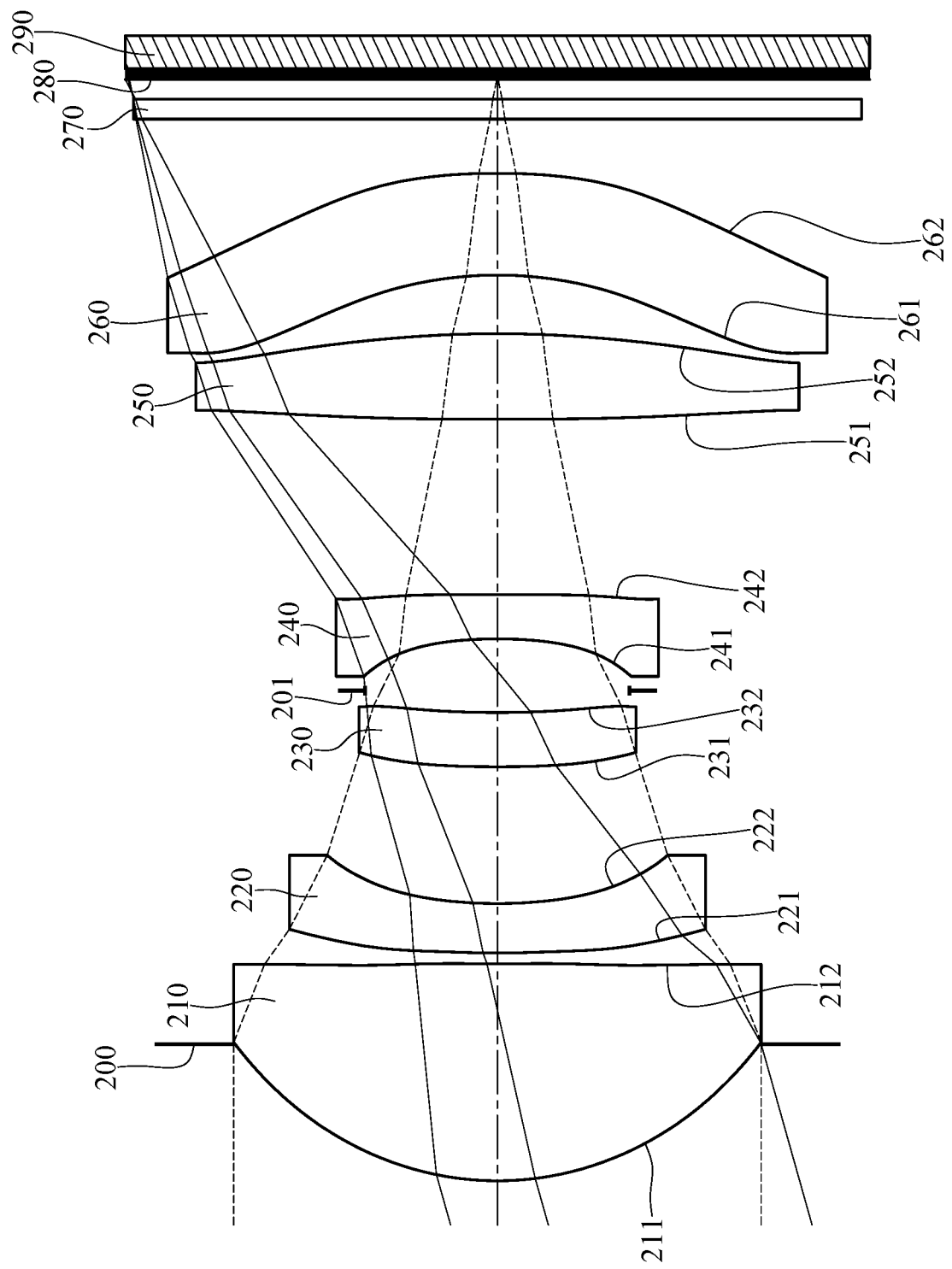
FIG. 3 is a schematic view of an image capturing unit according to the 2nd embodiment of the present disclosure.
Figure 4:
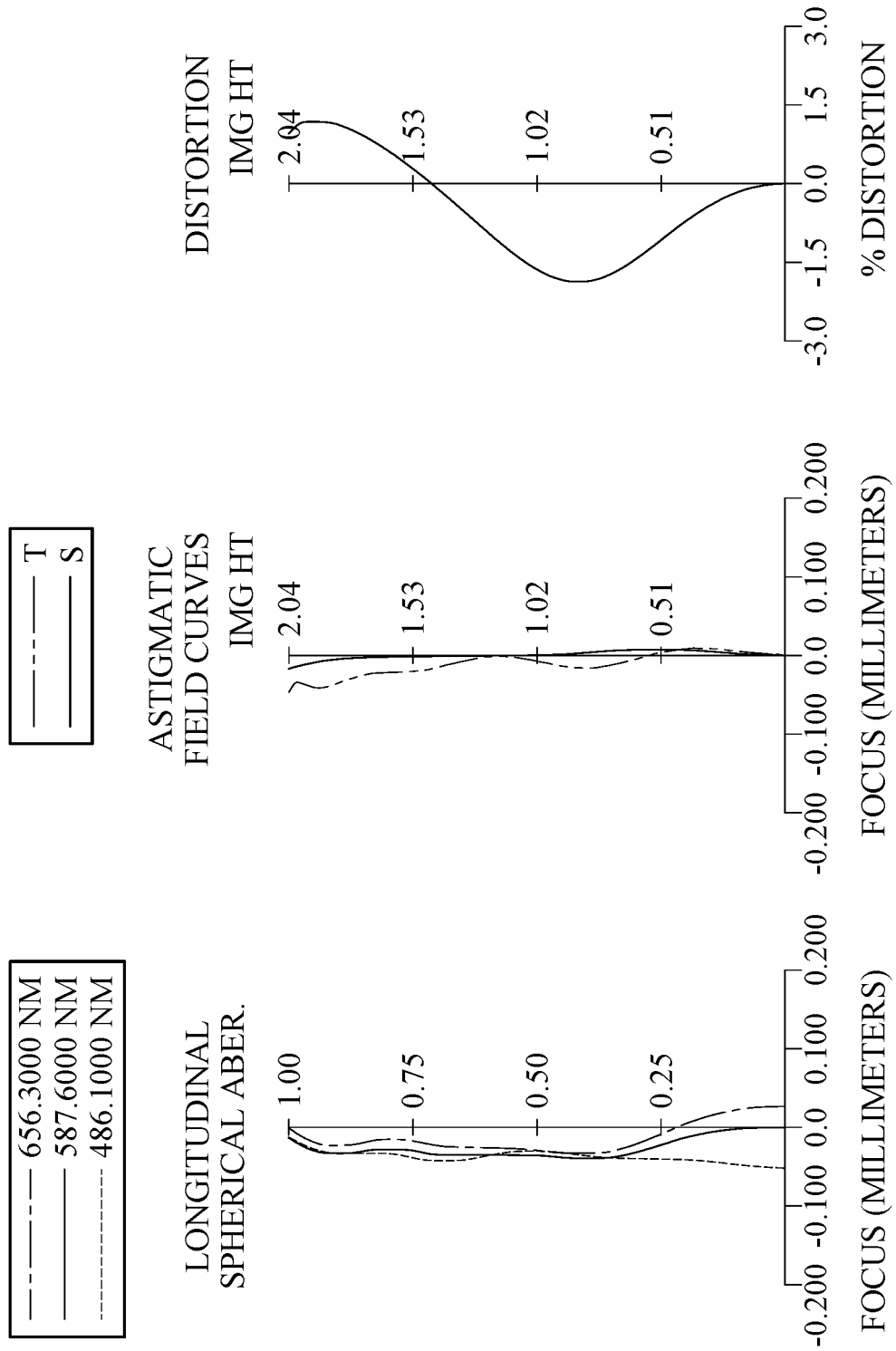
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, an aperture stop 200, a first lens element 210, a second lens element 220, a third lens element 230, a stop 201, a fourth lens element 240, a fifth lens element 250, a sixth lens element 260, a filter 270 and an image surface 280. The photographing optical lens assembly includes six lens elements (210, 220, 230, 240, 250 and 260) with no additional lens element disposed between each of the adjacent six lens elements, wherein there is an air gap between each of all adjacent lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The image-side surface 212 of the first lens element 210 has at least one inflection point. The image-side surface 212 of the first lens element 210 has at least one critical point in an off-axis region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one inflection point.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point.

The filter 270 is made of glass material and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 3 and the aspheric surface data are shown in Table 4 below.

TABLE 3

2nd Embodiment
f = 7.23 mm, Fno = 2.48, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.688 | (ASP) | 1.200 | Plastic | 1.545 | 56.1 | 3.40 |
| 3 | | 14.002 | (ASP) | 0.060 | | | | |
| 4 | Lens 2 | 5.076 | (ASP) | 0.273 | Plastic | 1.669 | 19.4 | −8.55 |
| 5 | | 2.631 | (ASP) | 0.756 | | | | |
| 6 | Lens 3 | 8.375 | (ASP) | 0.300 | Plastic | 1.534 | 55.9 | −65.90 |
| 7 | | 6.680 | (ASP) | 0.121 | | | | |
| 8 | Stop | Plano | | 0.286 | | | | |
| 9 | Lens 4 | −2.479 | (ASP) | 0.245 | Plastic | 1.544 | 56.0 | −4.62 |
| 10 | | −188.042 | (ASP) | 0.969 | | | | |
| 11 | Lens 5 | 40.816 | (ASP) | 0.473 | Plastic | 1.669 | 19.4 | 8.04 |
| 12 | | −6.168 | (ASP) | 0.324 | | | | |
| 13 | Lens 6 | −2.066 | (ASP) | 0.563 | Plastic | 1.544 | 56.0 | −9.53 |
| 14 | | −3.763 | (ASP) | 0.300 | | | | |
| 15 | Filter | Plano | | 0.110 | Glass | 1.517 | 64.2 | — |
| 16 | | Plano | | 0.108 | | | | |
| 17 | Image | Plano | | — | | | | |

Note:
Reference wavelength is 587.6 nm (d-line).
An effective radius of the stop 201 (Surface 8) is 0.730 mm.

TABLE 4

Aspheric Coefficients

| Surface # | 2 | 3 | 4 | 5 | 6 | 7 |
|---|---|---|---|---|---|---|
| k = | −3.6809E−01 | 5.7451E+01 | 4.2934E+00 | 1.1493E+00 | 8.7087E+01 | 4.0514E+01 |
| A4 = | 4.1177E−03 | −3.9663E−01 | −3.8291E−01 | −1.1492E−02 | 1.7813E−01 | 1.0993E−01 |
| A6 = | 8.0961E−04 | 1.0948E+00 | 1.2169E+00 | 3.8755E−01 | −1.5060E−01 | −1.6691E−01 |
| A8 = | −8.4223E−03 | −1.4972E+00 | −1.5909E+00 | −3.3563E−01 | 2.0615E−01 | −5.3128E−01 |
| A10 = | 1.8789E−02 | 1.1658E+00 | 9.7267E−01 | −2.8180E−01 | −9.5765E−01 | 7.9247E−01 |
| A12 = | −1.5081E−02 | −5.2839E−01 | −1.9514E−01 | 5.9897E−01 | 1.7880E+00 | −4.9741E−01 |
| A14 = | 5.5528E−03 | 1.3043E−01 | −5.4070E−02 | −2.4256E−01 | −1.1915E+00 | — |
| A16 = | −7.9200E−04 | −1.3672E−02 | 2.1766E−02 | — | — | — |

| Surface # | 9 | 10 | 11 | 12 | 13 | 14 |
|---|---|---|---|---|---|---|
| k = | −4.7511E+00 | −9.0000E+01 | −9.0000E+01 | 4.4879E+00 | 3.6692E−02 | 6.4455E−01 |
| A4 = | −2.5417E−01 | −6.6225E−02 | −1.4379E−02 | 2.0620E−02 | 9.8400E−02 | −6.1751E−02 |
| A6 = | 3.3942E−01 | −2.0702E−01 | 1.1856E−01 | −2.0238E−02 | −3.7441E−01 | −1.5178E−01 |
| A8 = | −5.1682E+00 | 1.3269E+00 | −2.3793E−01 | 2.2454E−02 | 5.6686E−01 | 3.4436E−01 |
| A10 = | 2.4789E+01 | −6.0891E+00 | 2.6160E−01 | −1.6134E−02 | −6.1936E−01 | −3.0943E−01 |
| A12 = | −7.0154E+01 | 1.8423E+01 | −1.7934E−01 | 6.3570E−03 | 3.4828E−01 | 1.6147E−01 |
| A14 = | 1.1384E+02 | −3.3163E+01 | 7.8089E−02 | −1.1700E−03 | −1.2221E−01 | −5.2910E−02 |
| A16 = | −9.4508E+01 | 3.5236E+01 | −2.0904E−02 | 7.6370E−05 | 2.6254E−02 | 1.0807E−02 |
| A18 = | 3.0002E+01 | −2.0356E+01 | 3.1266E−03 | — | −3.1687E−03 | −1.2625E−03 |
| A20 = | — | 4.8759E+00 | −1.9942E−04 | — | 1.6479E−04 | 6.4358E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

In addition, in the 2nd embodiment, the ratios of vertical distances between the critical points on the image-side surface 212 of the first lens element 210 and the optical axis to the central thickness of the first lens element 210 respectively have the following values: 0.20; 0.64; and 1.03.

Moreover, these parameters can be calculated from Table 3 and Table 4 as the following values and satisfy the following conditions:

| 2nd Embodiment | | | |
|---|---|---|---|
| f [mm] | 7.23 | f/f4 | −1.56 |
| Fno | 2.48 | |f2/f4| | 1.85 |
| HFOV [deg.] | 15.7 | |f/f3| + |f/f4| + |f/f5| + |f/f6| | 3.33 |
| Vdmin | 19.4 | EPD/ImgH | 1.43 |
| V5/V6 | 0.35 | ImgH/f | 0.28 |
| T45/T34 | 2.38 | TL/f | 0.84 |
| T56/CT6 | 0.58 | CT1/|SAG11| | 1.57 |
| (T23 − T34)/T45 | 0.36 | Y11/Y62 | 0.80 |
| f/R12 | −1.92 | Y11/Y32 | 1.96 |
| (R7 + R8)/(R7 − R8) | −1.03 | Y51/Y42 | 1.77 |

-continued

| 2nd Embodiment | | | |
|---|---|---|---|
| (R10 − R11)/(R10 + R11) | 0.50 | Yc12/CT1 | 0.20 |
| (R11 + R12)/(R11 − R12) | −3.43 | — | — |

3rd Embodiment

Figure 5:
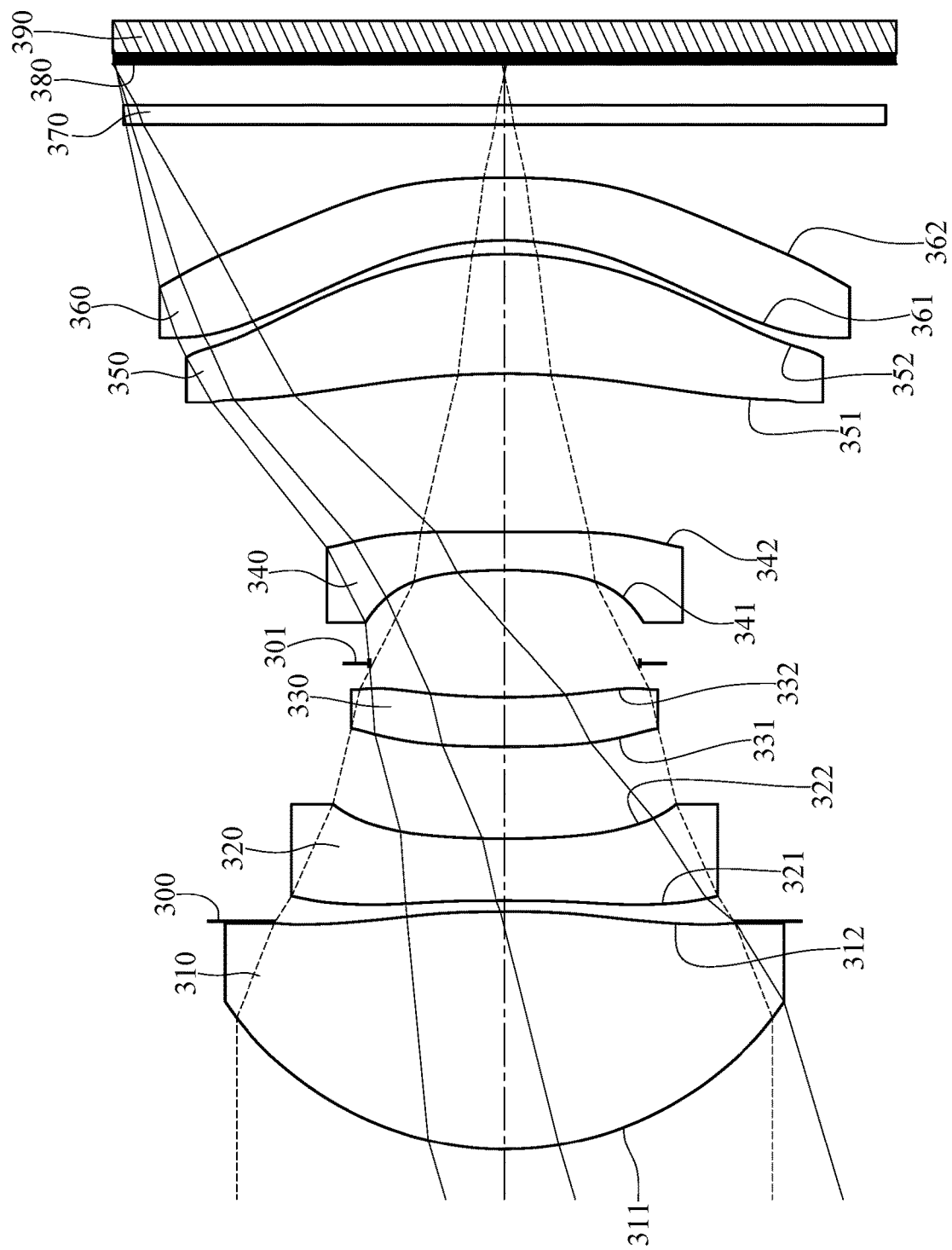
FIG. 5 is a schematic view of an image capturing unit according to the 3rd embodiment of the present disclosure.
Figure 6:
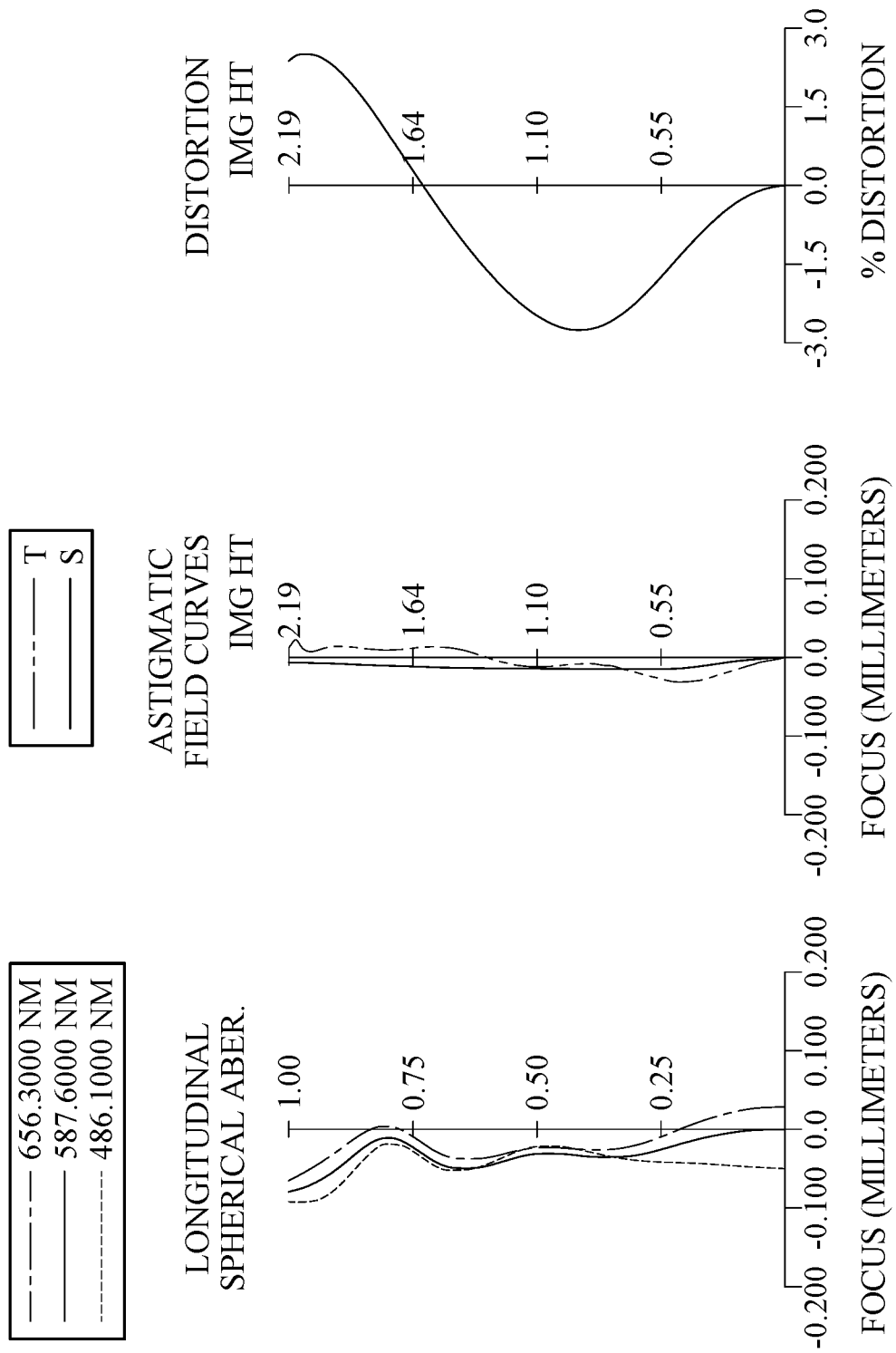
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, an aperture stop 300, a second lens element 320, a third lens element 330, a stop 301, a fourth lens element 340, a fifth lens element 350, a sixth lens element 360, a filter 370 and an image surface 380. The photographing optical lens assembly includes six lens elements (310, 320, 330, 340, 350 and 360) with no additional lens element disposed between each of the adjacent six lens elements, wherein there is an air gap between each of all adjacent lens elements.

The first lens element 310 with positive refractive power has an object-side surface 311 being convex in a paraxial region thereof and an image-side surface 312 being convex in a paraxial region thereof. The first lens element 310 is made of glass material and has the object-side surface 311 and the image-side surface 312 being both aspheric. The image-side surface 312 of the first lens element 310 has at least one inflection point. The image-side surface 312 of the first lens element 310 has at least one critical point in an off-axis region thereof.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point. The image-side surface 332 of the third lens element 330 has at least one inflection point.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one inflection point.

The filter 370 is made of glass material and located between the sixth lens element 360 and the image surface 380, and will not affect the focal length of the photographing optical lens assembly. The image sensor 390 is disposed on or near the image surface 380 of the photographing optical lens assembly.

The detailed optical data of the 3rd embodiment are shown in Table 5 and the aspheric surface data are shown in Table 6 below.

TABLE 5

3rd Embodiment
f = 7.23 mm, Fno = 2.40, HFOV = 16.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.848 | (ASP) | 1.336 | Glass | 1.548 | 45.8 | 2.95 |
| 2 | | −9.733 | (ASP) | −0.055 | | | | |
| 3 | Ape. Stop | Plano | | 0.116 | | | | |
| 4 | Lens 2 | −32.457 | (ASP) | 0.349 | Plastic | 1.679 | 18.4 | −6.57 |
| 5 | | 5.195 | (ASP) | 0.516 | | | | |
| 6 | Lens 3 | 8.597 | (ASP) | 0.278 | Plastic | 1.534 | 55.9 | −18.34 |
| 7 | | 4.526 | (ASP) | 0.190 | | | | |
| 8 | Stop | Plano | | 0.525 | | | | |
| 9 | Lens 4 | −3.152 | (ASP) | 0.215 | Plastic | 1.562 | 44.6 | −5.10 |
| 10 | | 32.152 | (ASP) | 0.891 | | | | |
| 11 | Lens 5 | −4.469 | (ASP) | 0.669 | Plastic | 1.669 | 19.5 | 5.27 |
| 12 | | −2.089 | (ASP) | 0.078 | | | | |
| 13 | Lens 6 | −1.809 | (ASP) | 0.352 | Plastic | 1.544 | 56.0 | −5.46 |
| 14 | | −4.945 | (ASP) | 0.300 | | | | |

TABLE 5-continued

3rd Embodiment
f = 7.23 mm, Fno = 2.40, HFOV = 16.5 deg.

| Surface # | | Curvature Radius | Thickness | Material | Index | Abbe # | Focal Length |
|---|---|---|---|---|---|---|---|
| 15 | Filter | Plano | 0.110 | Glass | 1.517 | 64.2 | — |
| 16 | | Plano | 0.229 | | | | |
| 17 | Image | Plano | — | | | | |

Note:
Reference wavelength is 587.6 nm (d-line).
An effective radius of the stop 301 (Surface 8) is 0.760 mm.

TABLE 6

Aspheric Coefficients

| Surface # | 1 | 2 | 4 | 5 | 6 | 7 |
|---|---|---|---|---|---|---|
| k = | −4.0707E−01 | −8.7021E+01 | −3.9622E+01 | 1.4195E+00 | 8.4078E+01 | 2.2762E+01 |
| A4 = | 2.9508E−03 | −3.8489E−01 | −3.8110E−01 | −1.7886E−02 | 1.7436E−01 | 6.2143E−02 |
| A6 = | 7.1519E−04 | 1.1003E+00 | 1.2215E+00 | 3.5488E−01 | −8.9254E−02 | −1.5077E−01 |
| A8 = | −7.4411E−03 | −1.4957E+00 | −1.5933E+00 | −2.7501E−01 | 1.2049E−01 | −4.2152E−01 |
| A10 = | 1.8487E−02 | 1.1631E+00 | 9.9922E−01 | −2.9254E−01 | −9.1247E−01 | 6.5902E−01 |
| A12 = | −1.5992E−02 | −5.2786E−01 | −2.0962E−01 | 6.0044E−01 | 1.7880E+00 | −4.9894E−01 |
| A14 = | 6.0542E−03 | 1.3340E−01 | −5.3032E−02 | −2.4256E−01 | −1.1915E+00 | — |
| A16 = | −8.2678E−04 | −1.4999E−02 | 2.1928E−02 | — | — | — |

| Surface # | 9 | 10 | 11 | 12 | 13 | 14 |
|---|---|---|---|---|---|---|
| k = | 1.0068E+01 | −5.9650E+01 | −8.7238E−01 | 4.0612E−02 | −1.8239E−01 | 5.0621E−01 |
| A4 = | −1.6529E−01 | −1.2976E−01 | −1.5449E−02 | −3.0421E−04 | 3.1389E−02 | −1.0649E−01 |
| A6 = | −1.2172E+00 | 7.0954E−02 | 1.2139E−01 | 7.8748E−02 | −2.1231E−01 | −1.4907E−01 |
| A8 = | 7.8032E+00 | −5.5296E−01 | −2.5782E−01 | −1.2311E−01 | 5.6851E−01 | 4.2768E−01 |
| A10 = | −3.5719E+01 | 1.8273E+00 | 3.3264E−01 | 1.0191E−01 | −6.5465E−01 | −4.1255E−01 |
| A12 = | 9.4065E+01 | −3.7020E+00 | −2.5921E−01 | −4.4031E−02 | 4.2761E−01 | 2.1812E−01 |
| A14 = | −1.4506E+02 | 4.9439E+00 | 1.2412E−01 | 9.7228E−03 | −1.6821E−01 | −6.8806E−02 |
| A16 = | 1.1760E+02 | −4.0568E+00 | −3.6077E−02 | −8.6778E−04 | 3.9452E−02 | 1.2847E−02 |
| A18 = | −3.7396E+01 | 1.8746E+00 | 5.9085E−03 | — | −5.0776E−03 | −1.3039E−03 |
| A20 = | — | −3.7818E−01 | −4.2450E−04 | — | 2.7573E−04 | 5.5056E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 7.23 | f/f4 | −1.42 |
|---|---|---|---|
| Fno | 2.40 | |f2/f4| | 1.29 |
| HFOV [deg.] | 16.5 | |f/f3| + |f/f4| + |f/f5| + |f/f6| | 4.51 |
| Vdmin | 18.4 | EPD/ImgH | 1.37 |
| V5/V6 | 0.35 | ImgH/f | 0.30 |
| T45/T34 | 1.25 | TL/f | 0.84 |
| T56/CT6 | 0.22 | CT1/|SAG11| | 1.61 |
| (T23 − T34)/T45 | −0.22 | Y11/Y62 | 0.81 |
| f/R12 | −1.46 | Y11/Y32 | 1.93 |
| (R7 + R8)/(R7 − R8) | −0.82 | Y51/Y42 | 1.65 |
| (R10 − R11)/(R10 + R11) | 0.07 | Yc12/CT1 | 0.84 |
| (R11 + R12)/(R11 − R12) | −2.15 | | |

4th Embodiment

Figure 7:
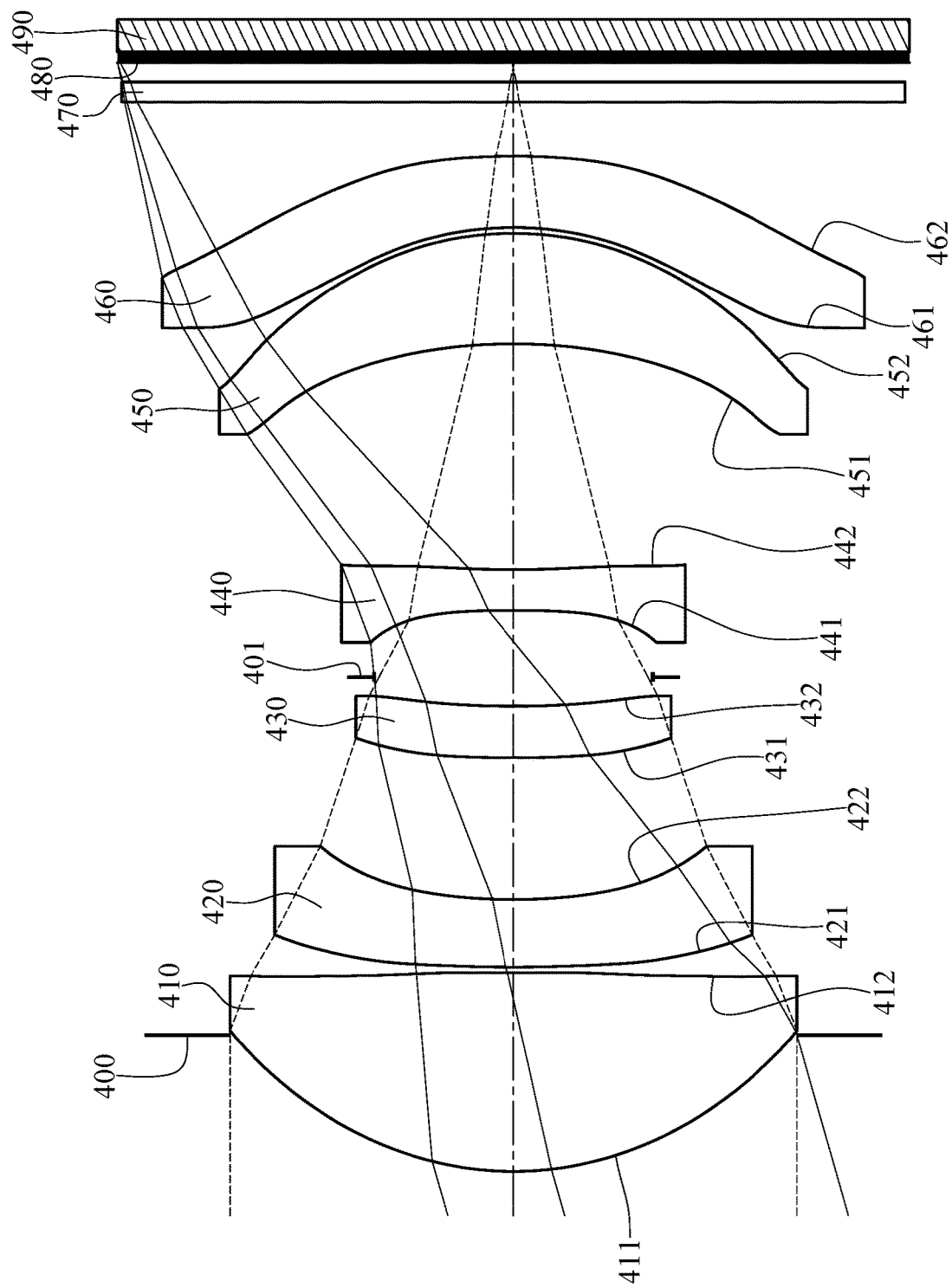
FIG. 7 is a schematic view of an image capturing unit according to the 4th embodiment of the present disclosure.
Figure 8:
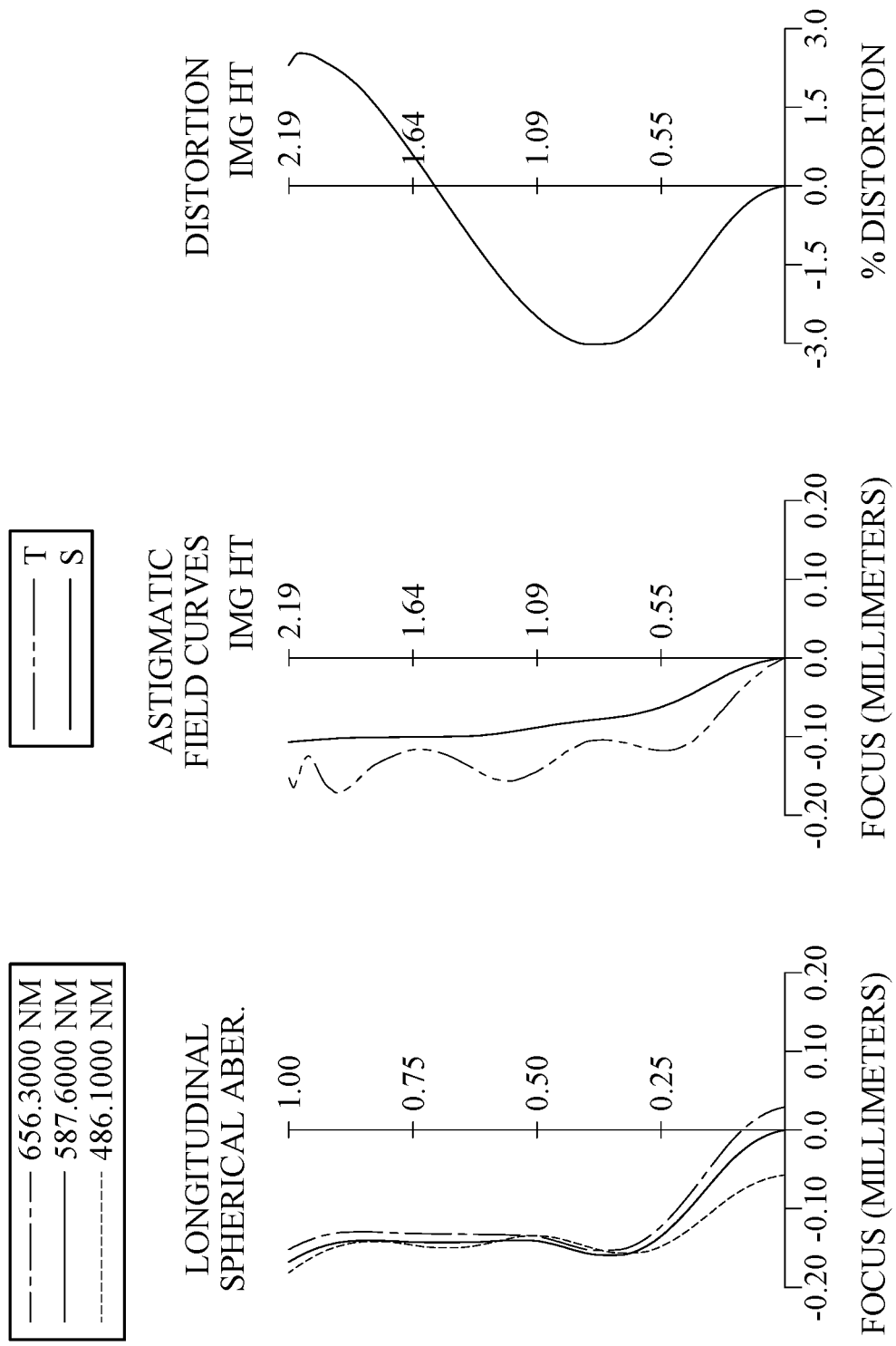
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, an aperture stop 400, a first lens element 410, a second lens element 420, a third lens element 430, a stop 401, a fourth lens element 440, a fifth lens element 450, a sixth lens element 460, a filter 470 and an image surface 480. The photographing optical lens assembly includes six lens elements (410, 420, 430, 440, 450 and 460) with no additional lens element disposed between each of the adjacent six lens elements, wherein there is an air gap between each of all adjacent lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has at least one inflection point. The image-side surface 412 of the first lens element 410 has at least one critical point in an off-axis region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point. The image-side surface 432 of the third lens element 430 has at least one inflection point.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one inflection point.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point.

The filter 470 is made of glass material and located between the sixth lens element 460 and the image surface 480, and will not affect the focal length of the photographing optical lens assembly. The image sensor 490 is disposed on or near the image surface 480 of the photographing optical lens assembly.

The detailed optical data of the 4th embodiment are shown in Table 7 and the aspheric surface data are shown in Table 8 below.

TABLE 7

4th Embodiment
f = 7.69 mm, Fno = 2.45, HFOV = 15.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.846 | (ASP) | 1.101 | Plastic | 1.545 | 56.1 | 3.57 |
| 3 | | 29.085 | (ASP) | 0.030 | | | | |
| 4 | Lens 2 | 6.101 | (ASP) | 0.373 | Plastic | 1.679 | 18.4 | −11.58 |
| 5 | | 3.351 | (ASP) | 0.787 | | | | |
| 6 | Lens 3 | 9.955 | (ASP) | 0.286 | Plastic | 1.534 | 55.9 | −25.21 |
| 7 | | 5.666 | (ASP) | 0.160 | | | | |
| 8 | Stop | Plano | | 0.369 | | | | |
| 9 | Lens 4 | −7.528 | (ASP) | 0.225 | Plastic | 1.544 | 56.0 | −5.38 |
| 10 | | 4.835 | (ASP) | 1.250 | | | | |
| 11 | Lens 5 | −3.230 | (ASP) | 0.614 | Plastic | 1.669 | 19.5 | 5.31 |
| 12 | | −1.820 | (ASP) | 0.032 | | | | |
| 13 | Lens 6 | −1.777 | (ASP) | 0.393 | Plastic | 1.566 | 37.4 | −5.74 |
| 14 | | −4.238 | (ASP) | 0.300 | | | | |
| 15 | Filter | Plano | | 0.110 | Glass | 1.517 | 64.2 | — |
| 16 | | Plano | | 0.107 | | | | |
| 17 | Image | Plano | | — | | | | |

Note:
Reference wavelength is 587.6 nm (d-line).
An effective radius of the stop 401 (Surface 8) is 0.770 mm.

TABLE 8

Aspheric Coefficients

| Surface # | 2 | 3 | 4 | 5 | 6 | 7 |
|---|---|---|---|---|---|---|
| k = | −4.2330E−01 | 7.1483E+01 | 4.7525E+00 | 1.3551E−01 | 9.0000E+01 | 3.9022E+01 |
| A4 = | 8.4858E−03 | −2.8717E−01 | −2.3813E−01 | 3.0928E−02 | 1.8192E−01 | 4.7818E−02 |
| A6 = | −1.4670E−02 | 6.9876E−01 | 6.4039E−01 | 1.4587E−01 | −4.2384E−01 | −1.2589E−01 |
| A8 = | 1.5607E−02 | −8.3028E−01 | −6.7832E−01 | −8.8678E−02 | 1.8942E+00 | 3.1752E−01 |
| A10 = | −7.2287E−03 | 5.5433E−01 | 3.1778E−01 | −9.5263E−02 | −5.0000E+00 | −1.2840E+00 |
| A12 = | 1.2187E−03 | −2.1261E−01 | −2.7963E−02 | 1.4250E−01 | 7.1071E+00 | 1.7327E+00 |
| A14 = | — | 4.4014E−02 | −2.5509E−02 | −4.6800E−02 | −5.1706E+00 | −9.9127E−01 |

TABLE 8-continued

| Aspheric Coefficients | | | | | | |
|---|---|---|---|---|---|---|
| A16 = | — | −3.8209E−03 | 6.2951E−03 | — | 1.4658E+00 | — |

| Surface # | 9 | 10 | 11 | 12 | 13 | 14 |
|---|---|---|---|---|---|---|
| k= | −6.0288E+00 | −7.9843E+01 | 1.9596E+00 | 6.9394E−03 | −1.5144E−01 | 1.7775E+00 |
| A4 = | −1.2536E−01 | −8.9054E−02 | −7.8402E−02 | −2.7226E−02 | 6.5463E−02 | −9.3243E−02 |
| A6 = | −2.8239E+00 | −1.4091E−01 | 2.6818E−01 | 1.6568E−02 | −3.5594E−01 | −6.2992E−02 |
| A8 = | 2.2577E+01 | 1.1449E+00 | −6.3976E−01 | 1.9317E−02 | 7.1166E−01 | 2.1107E−01 |
| A10 = | −1.0408E+02 | −3.4202E+00 | 9.6131E−01 | −1.8716E−02 | −6.8123E−01 | −1.9304E−01 |
| A12 = | 2.8589E+02 | 5.4125E+00 | −9.4713E−01 | 7.4496E−03 | 3.7863E−01 | 9.4699E−02 |
| A14 = | −4.6547E+02 | −3.7229E+00 | 6.2085E−01 | −2.1775E−02 | −1.2707E−01 | −2.7318E−02 |
| A16 = | 4.1317E+02 | −7.8386E−01 | −2.6409E−01 | 3.8685E−04 | 2.5349E−02 | 4.5536E−03 |
| A18 = | −1.5384E+02 | 2.7246E+00 | 6.5441E−02 | — | −2.7615E−03 | −3.8903E−04 |
| A20 = | — | −1.1645E+00 | −7.0305E−03 | — | 1.2640E−04 | 1.1698E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

In addition, in the 4th embodiment, the ratios of vertical distances between the critical points on the image-side surface 412 of the first lens element 410 and the optical axis to the central thickness of the first lens element 410 respectively have the following values: 0.17; and 1.16.

Moreover, these parameters can be calculated from Table 7 and Table 8 as the following values and satisfy the following conditions:

| 4th Embodiment | | | |
|---|---|---|---|
| f [mm] | 7.69 | f/f4 | −1.43 |
| Fno | 2.45 | |f2/f4| | 2.15 |
| HFOV [deg.] | 15.9 | |f/f3| + |f/f4| + |f/f5| + |f/f6| | 4.52 |
| Vdmin | 18.4 | EPD/ImgH | 1.43 |
| V5/V6 | 0.52 | ImgH/f | 0.28 |
| T45/T34 | 2.36 | TL/f | 0.80 |
| T56/CT6 | 0.08 | CT1/|SAG11| | 1.41 |
| (T23 − T34)/T45 | 0.21 | Y11/Y62 | 0.81 |
| f/R12 | −1.81 | Y11/Y32 | 1.97 |
| (R7 + R8)/(R7 − R8) | 0.22 | Y51/Y42 | 1.55 |
| (R10 − R11)/(R10 + R11) | 0.01 | Yc12/CT1 | 0.17 |
| (R11 + R12)/(R11 − R12) | −2.44 | — | — |

5th Embodiment

Figure 9:
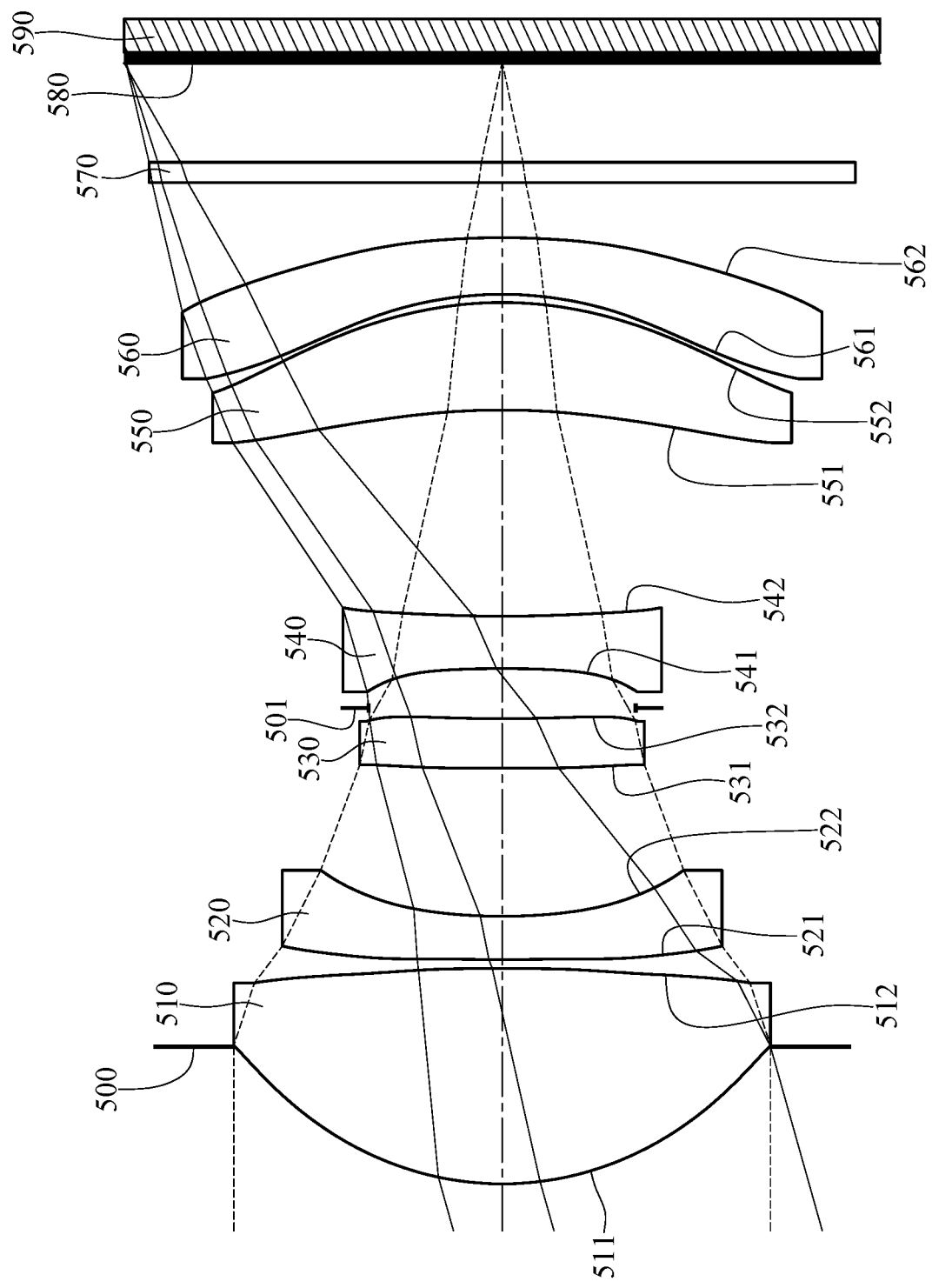
FIG. 9 is a schematic view of an image capturing unit according to the 5th embodiment of the present disclosure.
Figure 10:
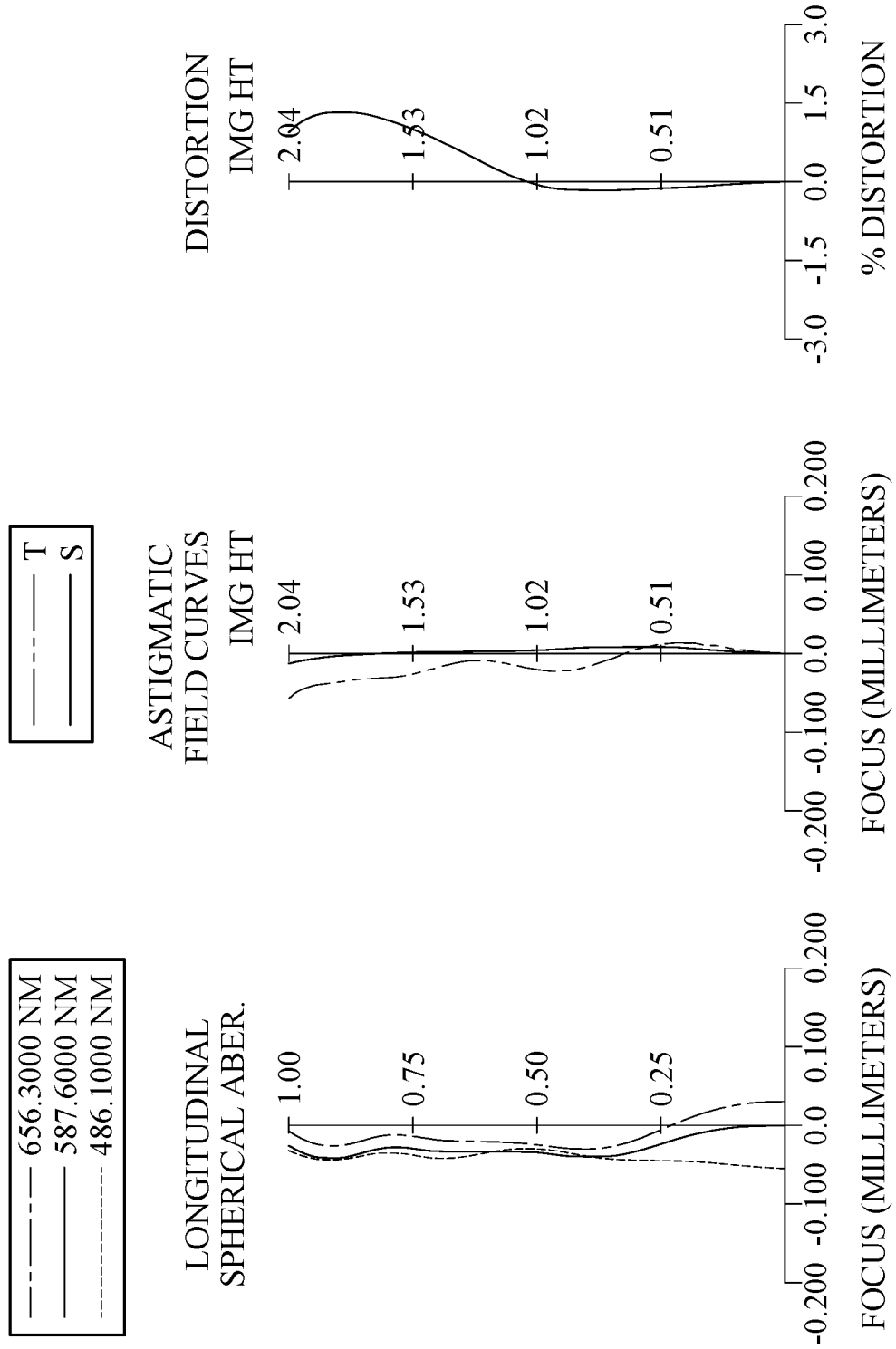
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, an aperture stop 500, a first lens element 510, a second lens element 520, a third lens element 530, a stop 501, a fourth lens element 540, a fifth lens element 550, a sixth lens element 560, a filter 570 and an image surface 580. The photographing optical lens assembly includes six lens elements (510, 520, 530, 540, 550 and 560) with no additional lens element disposed between each of the adjacent six lens elements, wherein there is an air gap between each of all adjacent lens elements.

The first lens element 510 with positive refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric. The object-side surface 511 of the first lens element 510 has at least one inflection point. The image-side surface 512 of the first lens element 510 has at least one inflection point. The image-side surface 512 of the first lens element 510 has at least one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one inflection point. The image-side surface 532 of the third lens element 530 has at least one inflection point.

The fourth lens element 540 with negative refractive power has an object-side surface 541 being concave in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has at least one inflection point.

The filter 570 is made of glass material and located between the sixth lens element 560 and the image surface 580, and will not affect the focal length of the photographing optical lens assembly. The image sensor 590 is disposed on or near the image surface 580 of the photographing optical lens assembly.

The detailed optical data of the 5th embodiment are shown in Table 9 and the aspheric surface data are shown in Table 10 below.

TABLE 9

5th Embodiment
f = 7.23 mm, Fno = 2.48, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.745 | | | | |
| 2 | Lens 1 | 1.661 | (ASP) | 1.169 | Glass | 1.548 | 45.8 | 3.06 |
| 3 | | 152.399 | (ASP) | 0.049 | | | | |
| 4 | Lens 2 | 9.051 | (ASP) | 0.235 | Plastic | 1.679 | 18.4 | −6.63 |
| 5 | | 2.975 | (ASP) | 0.805 | | | | |
| 6 | Lens 3 | 88.598 | (ASP) | 0.270 | Plastic | 1.534 | 55.9 | −22.09 |
| 7 | | 10.397 | (ASP) | 0.057 | | | | |
| 8 | Stop | Plano | | 0.215 | | | | |
| 9 | Lens 4 | −7.391 | (ASP) | 0.285 | Plastic | 1.562 | 44.6 | −6.77 |
| 10 | | 7.936 | (ASP) | 1.120 | | | | |
| 11 | Lens 5 | −3.958 | (ASP) | 0.584 | Plastic | 1.669 | 19.5 | 5.87 |
| 12 | | −2.088 | (ASP) | 0.045 | | | | |
| 13 | Lens 6 | −1.856 | (ASP) | 0.307 | Plastic | 1.544 | 56.0 | −6.27 |
| 14 | | −4.304 | (ASP) | 0.300 | | | | |
| 15 | Filter | Plano | | 0.110 | Glass | 1.517 | 64.2 | — |
| 16 | | Plano | | 0.537 | | | | |
| 17 | Image | Plano | | — | | | | |

Note:
Reference wavelength is 587.6 nm (d-line).
An effective radius of the stop 501 (Surface 8) is 0.725 mm.

TABLE 10

Aspheric Coefficients

| Surface # | | | | | |
|---|---|---|---|---|---|
| 2 | 3 | 4 | 5 | 6 | 7 |
| k = −3.6243E−01 | 9.0000E+01 | −8.6032E+00 | −4.3377E−01 | −9.0000E+01 | 6.3028E+01 |
| A4 = 5.3246E−03 | −3.9693E−01 | −3.8890E−01 | −2.3967E−02 | 1.5346E−01 | 4.0254E−02 |
| A6 = 2.9776E−04 | 1.0944E+00 | 1.2219E+00 | 3.8253E−01 | −2.1959E−01 | −2.0883E−01 |
| A8 = −9.1567E−03 | −1.4966E+00 | −1.5923E+00 | −3.2788E−01 | 3.3621E−01 | −6.1396E−01 |
| A10 = 1.8706E−02 | 1.1658E+00 | 9.7038E−01 | −2.9629E−01 | −1.1203E+00 | 9.4014E−01 |
| A12 = −1.4971E−02 | −5.2875E−01 | −1.9231E−01 | 5.9897E−01 | 1.7880E+00 | −4.9741E−01 |
| A14 = 5.6829E−03 | 1.3041E−01 | −5.4070E−02 | −2.4256E−01 | −1.1915E+00 | — |
| A16 = −9.0942E−04 | −1.3591E−02 | 2.1766E−02 | — | — | — |

| Surface # | | | | | |
|---|---|---|---|---|---|
| 9 | 10 | 11 | 12 | 13 | 14 |
| k = −2.4599E+01 | 2.2025E+01 | −6.0796E−01 | −1.2111E−02 | −4.5093E−02 | 1.2383E−01 |
| A4 = −2.1809E−01 | −1.0096E−02 | −3.8993E−02 | 3.5509E−02 | 2.1651E−01 | 6.8006E−02 |
| A6 = 3.8791E−01 | −2.2563E−01 | 2.9863E−01 | −2.8950E−02 | −7.9189E−01 | −3.8294E−01 |
| A8 = −5.3825E+00 | 1.3386E+00 | −6.7148E−01 | 2.4402E−02 | 1.5032E+00 | 6.7775E−01 |
| A10 = 2.5003E+01 | −6.1121E+00 | 8.7778E−01 | −6.6095E−03 | −1.5947E+00 | −6.3404E−01 |
| A12 = −7.0154E+01 | 1.8408E+01 | −7.1932E−01 | −4.6214E−04 | 1.0483E+00 | 3.5875E−01 |
| A14 = 1.1384E+02 | −3.3163E+01 | 3.7230E−01 | 7.1529E−04 | −4.3411E−01 | −1.2714E−01 |
| A16 = −9.4508E+01 | 3.5236E+01 | −1.1750E−01 | −1.1380E−04 | 1.1003E−01 | 2.7636E−02 |
| A18 = 3.0002E+01 | −2.0356E+01 | 2.0564E−02 | — | −1.5563E−02 | −3.3724E−03 |
| A20 = — | 4.8759E+00 | −1.5259E−03 | — | 9.3993E−04 | 1.7688E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 7.23 | f/f4 | −1.07 |
| Fno | 2.48 | \|f2/f4\| | 0.98 |
| HFOV [deg.] | 15.7 | \|f/f3\| + \|f/f4\| + \|f/f5\| + \|f/f6\| | 3.78 |
| Vdmin | 18.4 | EPD/ImgH | 1.43 |
| V5/V6 | 0.35 | ImgH/f | 0.28 |
| T45/T34 | 4.12 | TL/f | 0.84 |
| T56/CT6 | 0.15 | CT1/\|SAG11\| | 1.56 |
| (T23 − T34)/T45 | 0.48 | Y11/Y62 | 0.84 |
| f/R12 | −1.68 | Y11/Y32 | 1.98 |
| (R7 + R8)/(R7 − R8) | −0.04 | Y51/Y42 | 1.69 |
| (R10 − R11)/(R10 + R11) | 0.06 | Yc12/CT1 | 0.06 |
| (R11 + R12)/(R11 − R12) | −2.52 | — | — |

6th Embodiment

Figure 11:
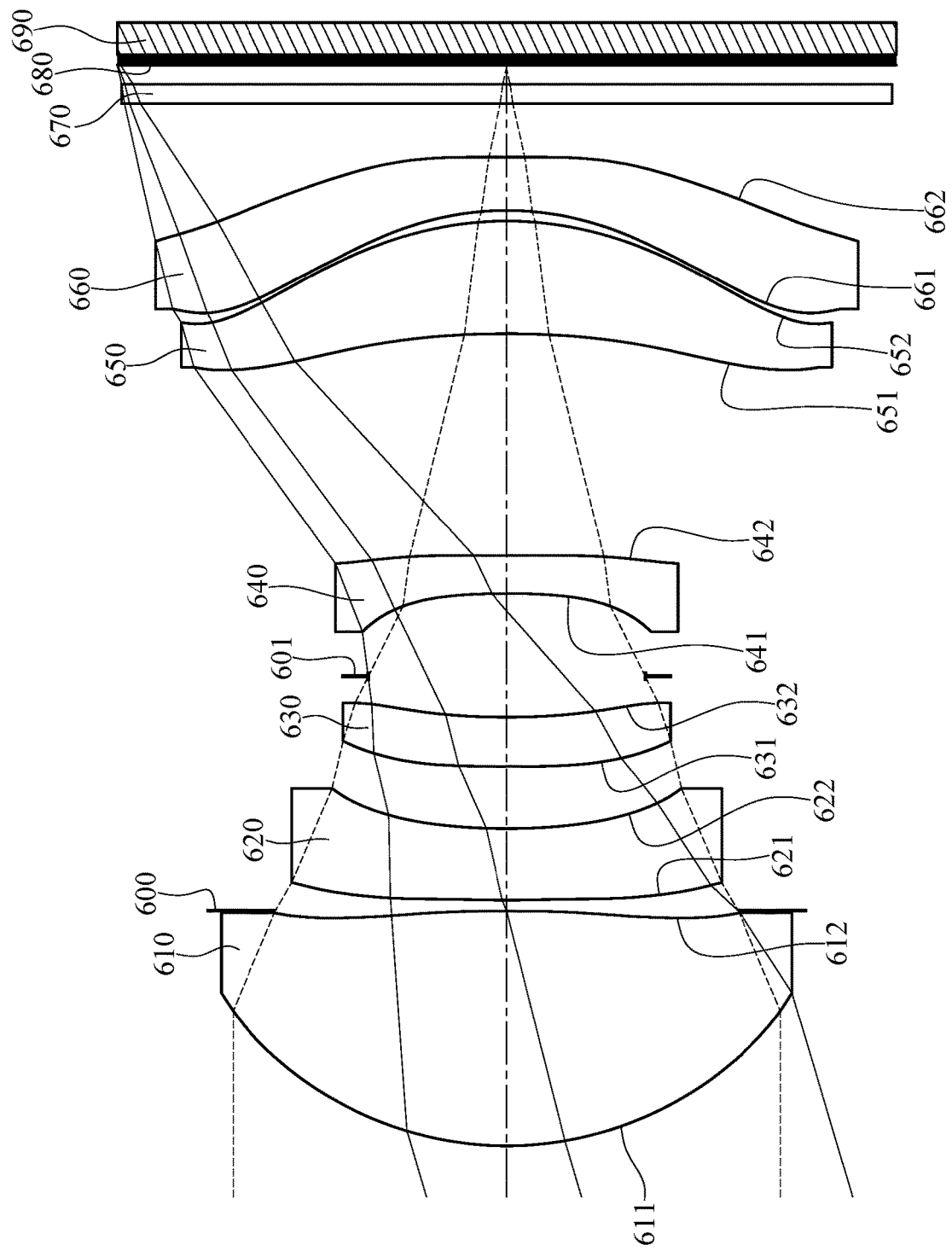
FIG. 11 is a schematic view of an image capturing unit according to the 6th embodiment of the present disclosure.
Figure 12:
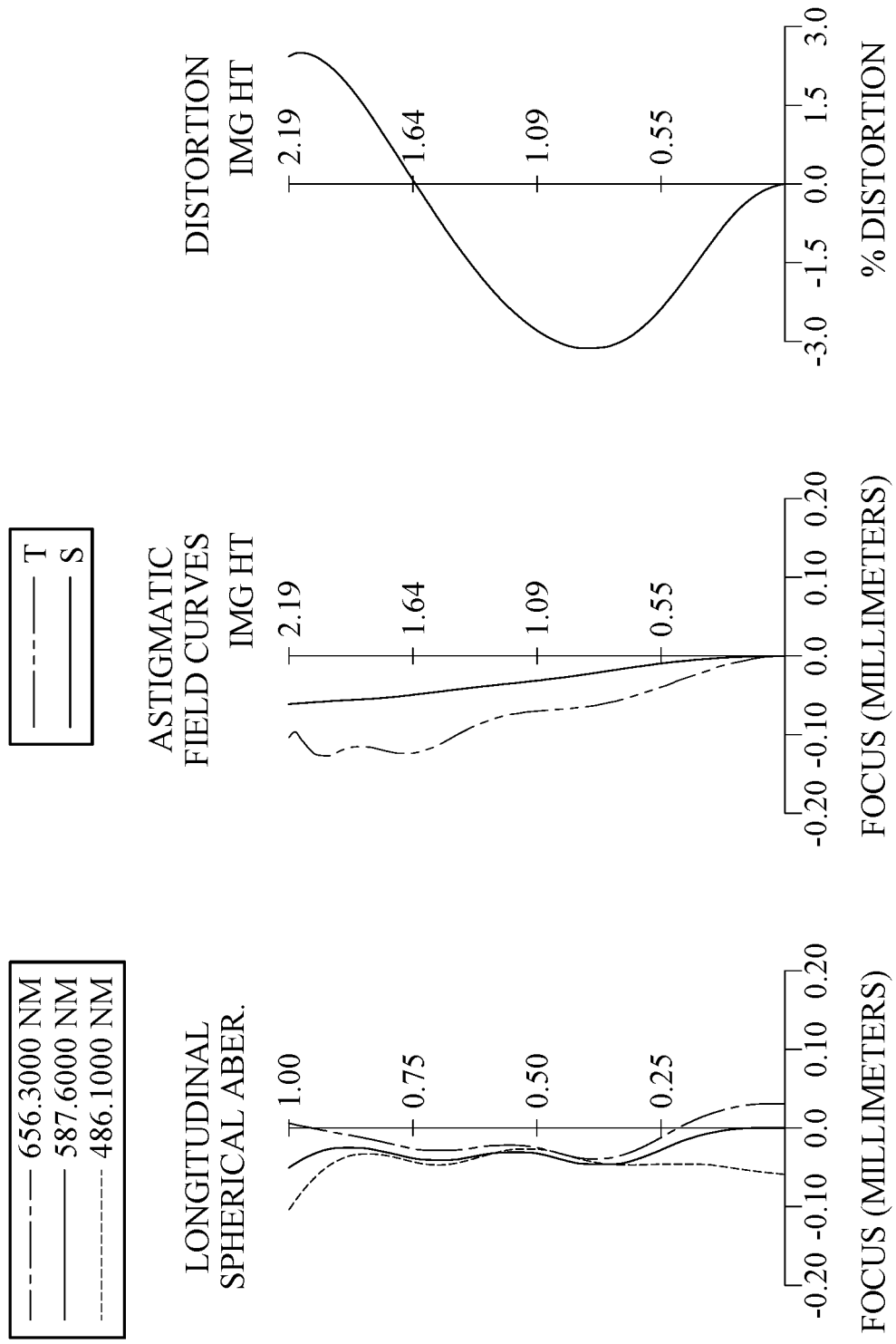
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, an aperture stop 600, a second lens element 620, a third lens element 630, a stop 601, a fourth lens element 640, a fifth lens element 650, a sixth lens element 660, a filter 670 and an image surface 680. The photographing optical lens assembly includes six lens elements (610, 620, 630, 640, 650 and 660) with no additional lens element disposed between each of the adjacent six lens elements, wherein there is an air gap between each of all adjacent lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. The image-side surface 612 of the first lens element 610 has at least one inflection point. The image-side surface 612 of the first lens element 610 has at least one critical point in an off-axis region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one inflection point.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point.

The filter 670 is made of glass material and located between the sixth lens element 660 and the image surface 680, and will not affect the focal length of the photographing optical lens assembly. The image sensor 690 is disposed on or near the image surface 680 of the photographing optical lens assembly.

The detailed optical data of the 6th embodiment are shown in Table 11 and the aspheric surface data are shown in Table 12 below.

TABLE 11

6th Embodiment
f = 7.24 mm, Fno = 2.35, HFOV = 16.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.918 | (ASP) | 1.324 | Plastic | 1.544 | 56.0 | 3.37 |
| 2 | | −31.960 | (ASP) | 0.003 | | | | |
| 3 | Ape. Stop | Plano | | 0.059 | | | | |
| 4 | Lens 2 | 6.350 | (ASP) | 0.402 | Plastic | 1.669 | 19.5 | −11.66 |
| 5 | | 3.412 | (ASP) | 0.352 | | | | |
| 6 | Lens 3 | 16.427 | (ASP) | 0.277 | Plastic | 1.534 | 55.9 | −12.12 |

TABLE 11-continued

6th Embodiment
f = 7.24 mm, Fno = 2.35, HFOV = 16.6 deg.

| Surface # | | Curvature Radius | | Thickness | Material | Index | Abbe # | Focal Length |
|---|---|---|---|---|---|---|---|---|
| 7 | | 4.616 | (ASP) | 0.230 | | | | |
| 8 | Stop | Plano | | 0.464 | | | | |
| 9 | Lens 4 | −4.314 | (ASP) | 0.215 | Plastic | 1.562 | 44.6 | −6.90 |
| 10 | | 38.847 | (ASP) | 1.250 | | | | |
| 11 | Lens 5 | −5.200 | (ASP) | 0.636 | Plastic | 1.679 | 18.4 | 4.14 |
| 12 | | −1.917 | (ASP) | 0.059 | | | | |
| 13 | Lens 6 | −1.685 | (ASP) | 0.300 | Plastic | 1.544 | 56.0 | −3.02 |
| 14 | | 75.672 | (ASP) | 0.300 | | | | |
| 15 | Filter | Plano | | 0.110 | Glass | 1.517 | 64.2 | — |
| 16 | | Plano | | 0.107 | | | | |
| 17 | Image | Plano | | — | | | | |

Note:
Reference wavelength is 587.6 nm (d-line).
An effective radius of the stop 601 (Surface 8) is 0.780 mm.

TABLE 12

Aspheric Coefficients

| | Surface # | | | | | |
|---|---|---|---|---|---|---|
| | 1 | 2 | 4 | 5 | 6 | 7 |
| k = | −3.9764E−01 | 9.0000E+01 | −6.1242E+01 | −3.6027E+00 | 9.0000E+01 | 2.5886E+01 |
| A4 = | 5.7476E−03 | −3.8445E−01 | −3.9839E−01 | −2.6383E−02 | 2.7194E−01 | 1.0240E−01 |
| A6 = | −5.5404E−03 | 1.1032E+00 | 1.2179E+00 | 3.3116E−01 | −3.5497E−01 | 1.4785E−02 |
| A8 = | −3.7891E−03 | −1.4951E+00 | −1.5863E+00 | −2.4396E−01 | 8.2792E−01 | −2.2154E+00 |
| A10 = | 1.9318E−02 | 1.1612E+00 | 9.9635E−01 | −3.1822E−01 | −1.6550E+00 | 8.8357E+00 |
| A12 = | −1.6916E−02 | −5.2703E−01 | −2.0965E−01 | 6.0044E−01 | 1.9804E+00 | −1.8011E+01 |
| A14 = | 6.0686E−03 | 1.3340E−01 | −5.3032E−02 | −2.4256E−01 | −1.2288E+00 | 1.8371E+01 |
| A16 = | −7.7132E−04 | −1.4999E−02 | 2.1928E−02 | 6.3158E−09 | 3.1422E−01 | −7.5664E+00 |

| | Surface # | | | | | |
|---|---|---|---|---|---|---|
| | 9 | 10 | 11 | 12 | 13 | 14 |
| k = | 5.5413E+00 | −4.3160E+01 | 1.3345E+00 | −1.6294E−01 | −4.5310E−01 | −9.0000E+01 |
| A4 = | −1.7042E−01 | −9.6224E−02 | −1.0433E−01 | −5.4944E−03 | 5.2332E−02 | −2.9258E−01 |
| A6 = | −8.7772E−01 | −5.2813E−01 | 3.7998E−01 | 8.5979E−02 | −3.5111E−01 | 1.7910E−01 |
| A8 = | 3.8303E+00 | 2.9978E+00 | −7.9357E−01 | −1.2721E−01 | 8.5547E−01 | 7.3840E−02 |
| A10 = | −6.7991E+00 | −8.1734E+00 | 9.5954E−01 | 9.8143E−02 | −9.6885E−01 | −1.8456E−01 |
| A12 = | −6.8097E+00 | 1.2900E+01 | −6.9543E−01 | −3.8881E−02 | 6.2785E−01 | 1.2825E−01 |
| A14 = | 4.5570E+01 | −1.1238E+01 | 3.1032E−01 | 7.7906E−03 | −2.4573E−01 | −4.7664E−02 |
| A16 = | −6.5915E+01 | 4.5107E+00 | −8.3782E−02 | −6.2346E−04 | 5.7586E−02 | 1.0194E−02 |
| A18 = | 3.2319E+01 | −1.8586E−01 | 1.2572E−02 | — | −7.4515E−03 | −1.1850E−03 |
| A20 = | — | −2.4086E−01 | −8.0536E−04 | — | 4.0970E−04 | 5.8138E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.24 | f/f4 | −1.05 |
| Fno | 2.35 | |f2/f4| | 1.69 |
| HFOV [deg.] | 16.6 | |f/f3| + |f/f4| + |f/f5| + |f/f6| | 5.79 |
| Vdmin | 18.4 | EPD/ImgH | 1.41 |
| V5/V6 | 0.33 | ImgH/f | 0.30 |

-continued

| 6th Embodiment | | | |
|---|---|---|---|
| T45/T34 | 1.80 | TL/f | 0.84 |
| T56/CT6 | 0.20 | CT1/|SAG11| | 1.54 |
| (T23 − T34)/T45 | −0.27 | Y11/Y62 | 0.81 |
| f/R12 | 0.10 | Y11/Y32 | 1.88 |
| (R7 + R8)/(R7 − R8) | −0.80 | Y51/Y42 | 1.83 |
| (R10 − R11)/(R10 + R11) | 0.06 | Yc12/CT1 | 0.75 |
| (R11 + R12)/(R11 − R12) | −0.96 | — | — |

7th Embodiment

Figure 13:
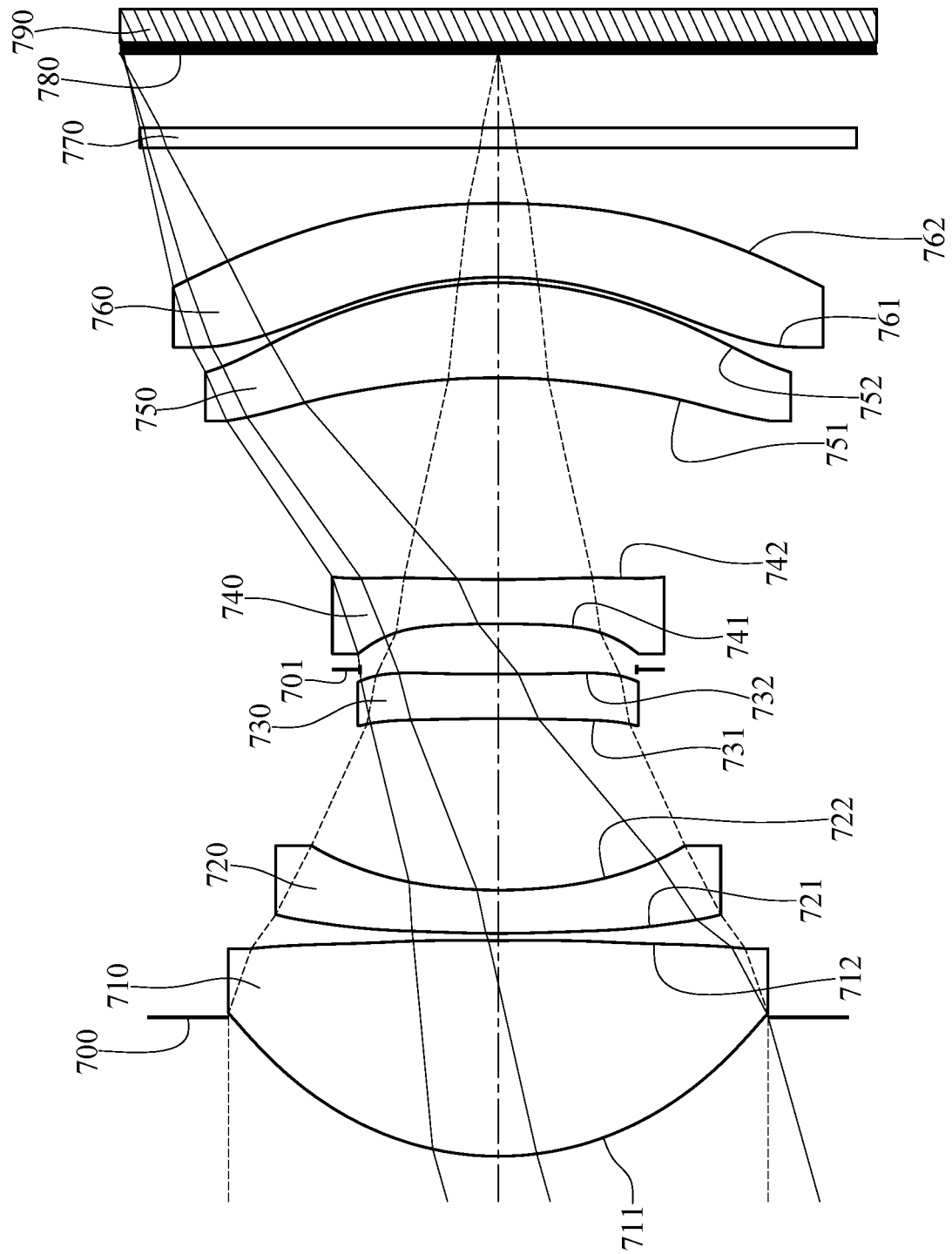
FIG. 13 is a schematic view of an image capturing unit according to the 7th embodiment of the present disclosure.
Figure 14:
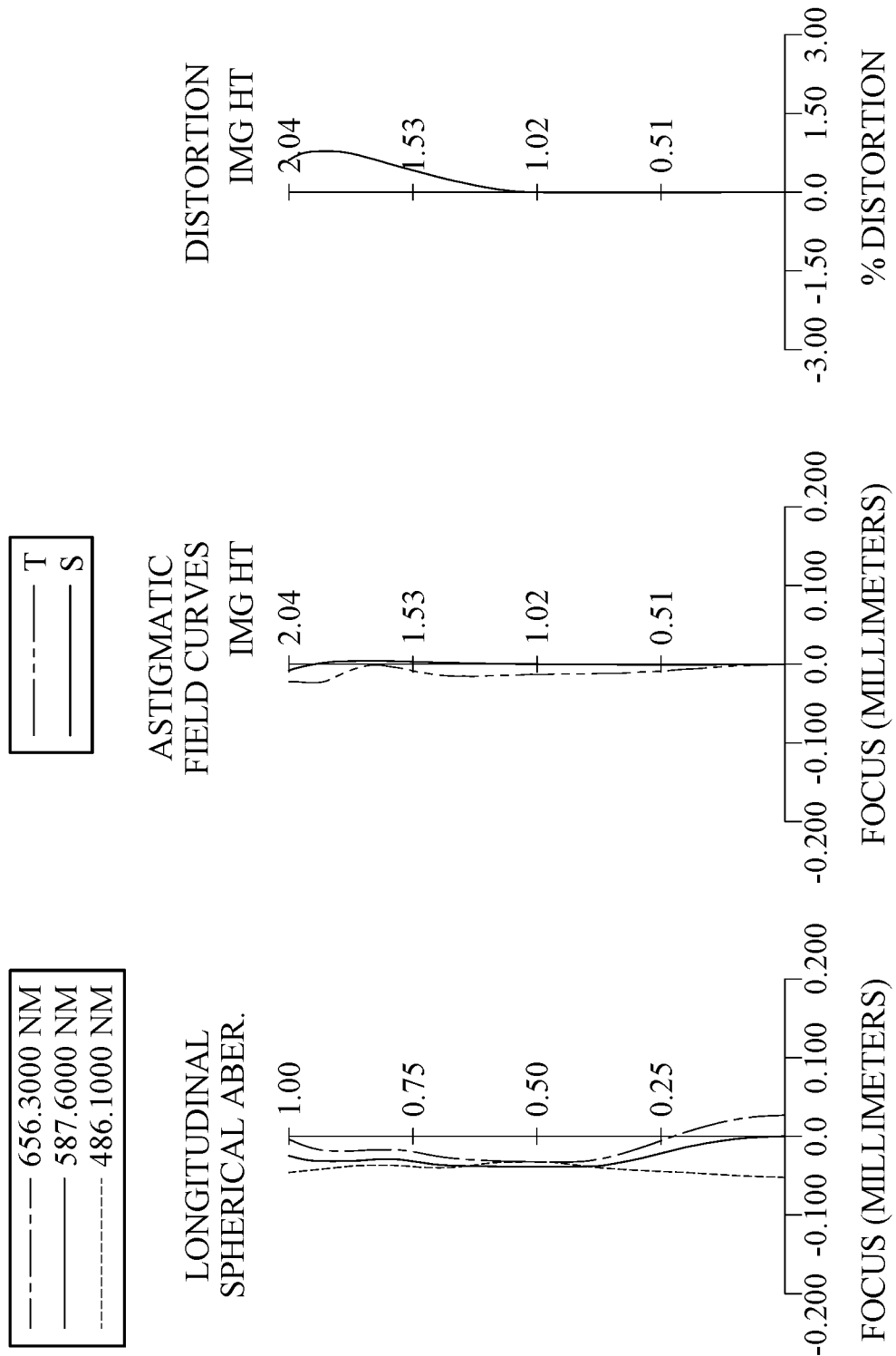
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, an aperture stop 700, a first lens element 710, a second lens element 720, a third lens element 730, a stop 701, a fourth lens element 740, a fifth lens element 750, a sixth lens element 760, a filter 770 and an image surface 780. The photographing optical lens assembly includes six lens elements (710, 720, 730, 740, 750 and 760) with no additional lens element disposed between each of the adjacent six lens elements, wherein there is an air gap between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The image-side surface 712 of the first lens element 710 has at least one inflection point. The image-side surface 712 of the first lens element 710 has at least one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has at least one inflection point.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one inflection point.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 762 of the sixth lens element 760 has at least one inflection point.

The filter 770 is made of glass material and located between the sixth lens element 760 and the image surface 780, and will not affect the focal length of the photographing optical lens assembly. The image sensor 790 is disposed on or near the image surface 780 of the photographing optical lens assembly.

The detailed optical data of the 7th embodiment are shown in Table 13 and the aspheric surface data are shown in Table 14 below.

TABLE 13

7th Embodiment
f = 7.25 mm, Fno = 2.48, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.635 | (ASP) | 1.170 | Plastic | 1.545 | 56.1 | 3.23 |
| 3 | | 16.940 | (ASP) | 0.039 | | | | |
| 4 | Lens 2 | 5.592 | (ASP) | 0.235 | Plastic | 1.669 | 19.4 | −8.85 |
| 5 | | 2.827 | (ASP) | 0.931 | | | | |
| 6 | Lens 3 | −7.925 | (ASP) | 0.241 | Plastic | 1.544 | 56.0 | −12.79 |
| 7 | | 57.763 | (ASP) | 0.024 | | | | |
| 8 | Stop | Plano | | 0.249 | | | | |
| 9 | Lens 4 | −6.212 | (ASP) | 0.240 | Plastic | 1.544 | 56.0 | −6.84 |
| 10 | | 9.394 | (ASP) | 1.095 | | | | |
| 11 | Lens 5 | −3.640 | (ASP) | 0.515 | Plastic | 1.669 | 19.4 | 6.29 |
| 12 | | −2.063 | (ASP) | 0.030 | | | | |
| 13 | Lens 6 | −1.996 | (ASP) | 0.401 | Plastic | 1.544 | 56.0 | −7.47 |
| 14 | | −4.200 | (ASP) | 0.300 | | | | |
| 15 | Filter | Plano | | 0.110 | Glass | 1.517 | 64.2 | — |
| 16 | | Plano | | 0.403 | | | | |
| 17 | Image | Plano | | — | | | | |

Note:
Reference wavelength is 587.6 nm (d-line).
An effective radius of the stop 701 (Surface 8) is 0.750 mm.

TABLE 14

Aspheric Coefficients

| Surface # | | | | | |
|---|---|---|---|---|---|
| 2 | 3 | 4 | 5 | 6 | 7 |
| k = −3.6844E−01 | 0.0000E+00 | 0.0000E+00 | 0.0000E+00 | 0.0000E+00 | 0.0000E+00 |
| A4 = 2.3314E−03 | −3.1527E−01 | −2.5517E−01 | 3.7350E−02 | 2.7824E−01 | 3.2745E−01 |
| A6 = 5.9974E−03 | 6.8248E−01 | 5.1978E−01 | −3.5088E−02 | −9.9341E−01 | −1.4018E+00 |
| A8 = −1.4090E−02 | −7.2267E−01 | −2.5433E−01 | 4.0137E−01 | 2.0267E+00 | 1.9908E+00 |
| A10 = 1.7525E−02 | 4.0881E−01 | −3.4604E−01 | −9.0757E−01 | −3.9513E+00 | −3.4377E+00 |
| A12 = −1.0527E−02 | −1.1804E−01 | 5.1174E−01 | 8.6168E−01 | 4.6296E+00 | 4.2369E+00 |
| A14 = 3.2633E−03 | 1.2729E−02 | −2.4736E−01 | −3.5810E−01 | −2.4015E+00 | −2.1204E+00 |
| A16 = −4.8013E−04 | 3.7468E−04 | 4.3090E−02 | 5.1269E−02 | — | — |

| Surface # | | | | | |
|---|---|---|---|---|---|
| 9 | 10 | 11 | 12 | 13 | 14 |
| k = 0.0000E+00 | 0.0000E+00 | 0.0000E+00 | 0.0000E+00 | 0.0000E+00 | 0.0000E+00 |
| A4 = −2.3256E−03 | 2.3849E−02 | 2.1613E−02 | 7.4590E−02 | 1.4698E−01 | 2.9428E−02 |
| A6 = −8.9828E−01 | −4.5821E−01 | 2.1331E−02 | −9.5775E−02 | −3.1943E−01 | −1.3133E−01 |
| A8 = −1.0763E+00 | 3.0061E−01 | −2.7058E−02 | 1.1684E−01 | 4.1576E−01 | 1.4831E−01 |
| A10 = 1.1402E+01 | 9.6205E−01 | −3.8192E−02 | −8.9828E−02 | −2.7608E−01 | −8.3476E−02 |
| A12 = −4.0546E+01 | −1.5336E+00 | 6.9396E−02 | 3.9076E−02 | 9.7065E−02 | 2.4991E−02 |
| A14 = 7.7329E+01 | 9.8771E−01 | −3.9079E−02 | −7.9690E−03 | −1.3233E−02 | −3.1013E−03 |
| A16 = −7.1362E+01 | −3.1664E−01 | 9.7223E−03 | 4.4068E−04 | −1.9575E−03 | −2.7621E−04 |
| A18 = 2.4530E+01 | — | −9.1572E−04 | 3.7527E−05 | 8.8273E−04 | 1.2787E−04 |
| A20 = — | — | — | — | −8.4905E−05 | −1.1081E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 7.25 | f/f4 | −1.06 |
| Fno | 2.48 | |f2/f4| | 1.29 |
| HFOV [deg.] | 15.7 | |f/f3| + |f/f4| + |f/f5| + |f/f6| | 3.75 |
| Vdmin | 19.4 | EPD/ImgH | 1.43 |
| V5/V6 | 0.35 | ImgH/f | 0.28 |
| T45/T34 | 4.01 | TL/f | 0.83 |
| T56/CT6 | 0.07 | CT1/|SAG11| | 1.51 |
| (T23 − T34)/T45 | 0.60 | Y11/Y62 | 0.83 |
| f/R12 | −1.73 | Y11/Y32 | 1.92 |
| (R7 + R8)/(R7 − R8) | −0.20 | Y51/Y42 | 1.64 |
| (R10 − R11)/(R10 + R11) | 0.02 | Yc12/CT1 | 0.20 |
| (R11 + R12)/(R11 − R12) | −2.81 | | |

8th Embodiment

Figure 15:
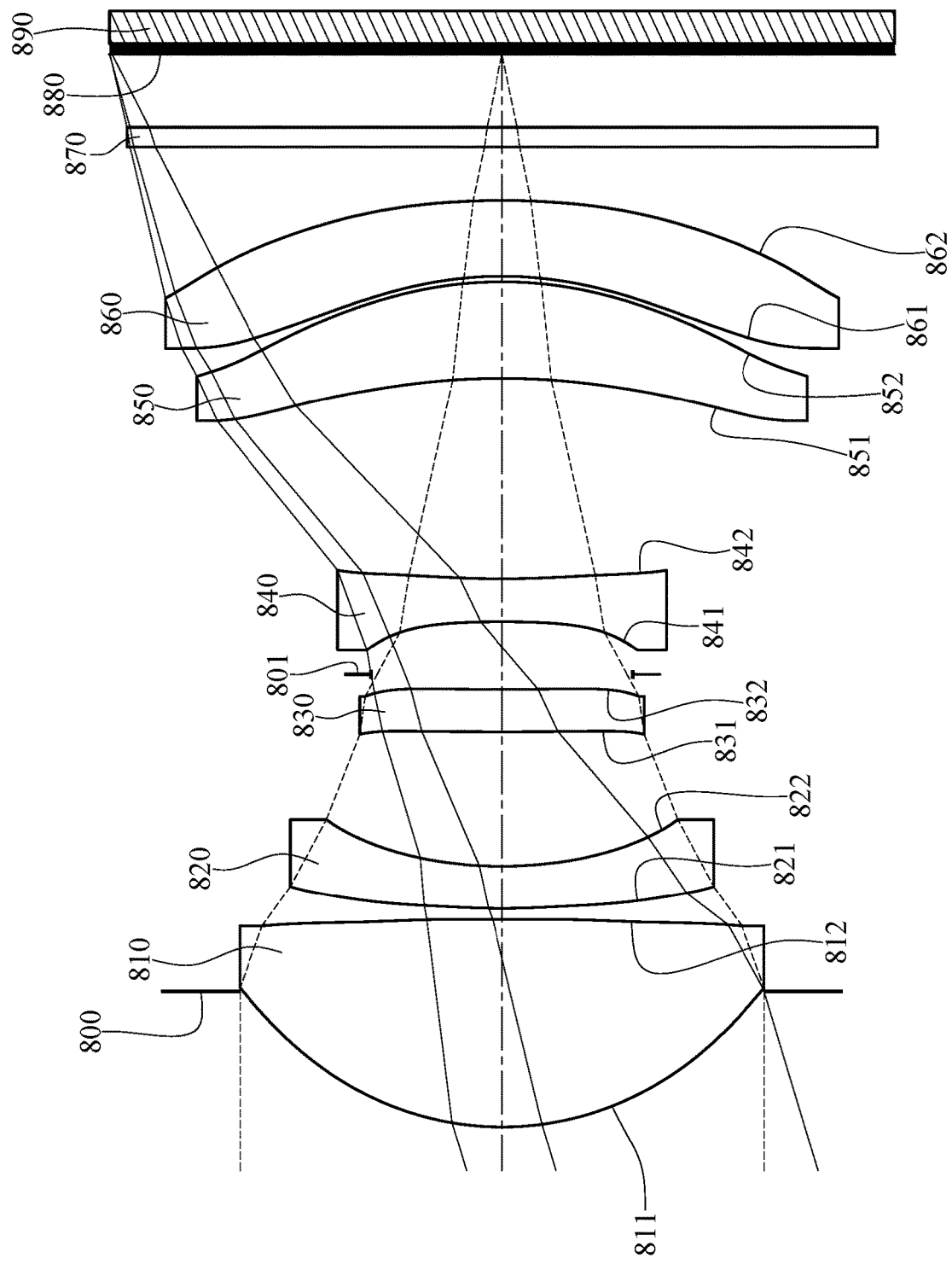
FIG. 15 is a schematic view of an image capturing unit according to the 8th embodiment of the present disclosure.
Figure 16:
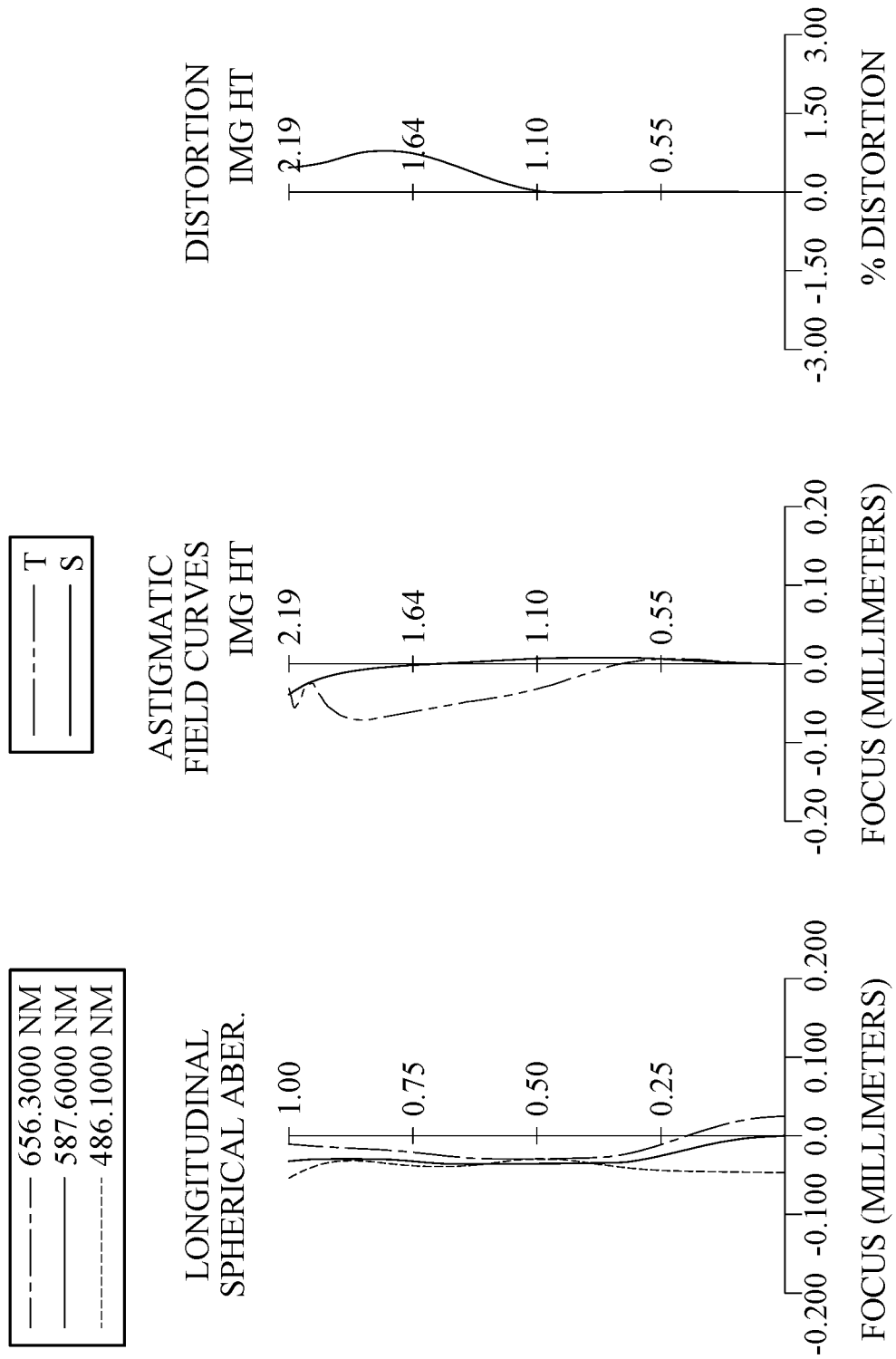
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 890. The photographing optical lens assembly includes, in order from an object side to an image side, an aperture stop 800, a first lens element 810, a second lens element 820, a third lens element 830, a stop 801, a fourth lens element 840, a fifth lens element 850, a sixth lens element 860, a filter 870 and an image surface 880. The photographing optical lens assembly includes six lens elements (810, 820, 830, 840, 850 and 860) with no additional lens element disposed between each of the adjacent six lens elements, wherein there is an air gap between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one inflection point. The image-side surface 812 of the first lens element 810 has at least one inflection point. The image-side surface 812 of the first lens element 810 has at least one critical point in an off-axis region thereof.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has at least one inflection point. The image-side surface 832 of the third lens element 830 has at least one inflection point.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one inflection point.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point.

The filter 870 is made of glass material and located between the sixth lens element 860 and the image surface 880, and will not affect the focal length of the photographing optical lens assembly. The image sensor 890 is disposed on or near the image surface 880 of the photographing optical lens assembly.

The detailed optical data of the 8th embodiment are shown in Table 15 and the aspheric surface data are shown in Table 16 below.

TABLE 15

8th Embodiment
f = 7.25 mm, Fno = 2.48, HFOV = 16.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.654 | (ASP) | 1.158 | Plastic | 1.545 | 56.1 | 3.23 |
| 3 | | 20.438 | (ASP) | 0.061 | | | | |
| 4 | Lens 2 | 3.764 | (ASP) | 0.235 | Plastic | 1.669 | 19.4 | −7.76 |
| 5 | | 2.128 | (ASP) | 0.751 | | | | |
| 6 | Lens 3 | 100.000 | (ASP) | 0.235 | Plastic | 1.534 | 55.9 | −49.64 |
| 7 | | 20.933 | (ASP) | 0.084 | | | | |
| 8 | Stop | Plano | | 0.296 | | | | |
| 9 | Lens 4 | −5.556 | (ASP) | 0.240 | Plastic | 1.544 | 56.0 | −5.16 |
| 10 | | 5.752 | (ASP) | 1.119 | | | | |
| 11 | Lens 5 | −3.915 | (ASP) | 0.538 | Plastic | 1.669 | 19.4 | 7.07 |
| 12 | | −2.261 | (ASP) | 0.031 | | | | |
| 13 | Lens 6 | −2.075 | (ASP) | 0.422 | Plastic | 1.544 | 56.0 | −8.66 |
| 14 | | −3.973 | (ASP) | 0.300 | | | | |
| 15 | Filter | Plano | | 0.110 | Glass | 1.517 | 64.2 | — |
| 16 | | Plano | | 0.406 | | | | |
| 17 | Image | Plano | | — | | | | |

Note:
Reference wavelength is 587.6 nm (d-line).
An effective radius of the stop 801 (Surface 8) is 0.730 mm.

TABLE 16

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −3.5330E−01 | 0.0000E+00 | 0.0000E+00 | 0.0000E+00 | 0.0000E+00 | 0.0000E+00 |
| A4 = | 4.9031E−03 | −3.1410E−01 | −3.9505E−01 | −1.3985E−01 | 7.0678E−02 | 1.7744E−02 |
| A6 = | −4.9347E−04 | 7.6712E−01 | 9.5548E−01 | 5.4446E−01 | −1.4054E−01 | −2.9033E−01 |
| A8 = | −6.1417E−03 | −9.3968E−01 | −1.0428E+00 | −1.0010E+00 | −1.2994E−02 | 7.6061E−02 |
| A10 = | 1.4911E−02 | 6.5811E−01 | 4.8839E−01 | 1.5613E+00 | −7.4159E−02 | −3.4102E−01 |
| A12 = | −1.2263E−02 | −2.6980E−01 | −1.4329E−02 | −1.9671E+00 | −2.6269E−02 | 3.1397E−01 |
| A14 = | 4.6989E−03 | 6.0508E−02 | −6.0721E−02 | 1.4439E+00 | — | — |
| A16 = | −7.5000E−04 | −5.7748E−03 | 1.4306E−02 | −4.1247E−01 | — | — |

| Surface # | | | | | |
|---|---|---|---|---|---|
| 9 | 10 | 11 | 12 | 13 | 14 |

| | 9 | 10 | 11 | 12 | 13 | 14 |
|---|---|---|---|---|---|---|
| k = | 0.0000E+00 | 0.0000E+00 | 0.0000E+00 | 0.0000E+00 | 0.0000E+00 | 0.0000E+00 |
| A4 = | −2.2867E−01 | −5.4523E−02 | −2.4555E−03 | −3.0218E−03 | 8.7590E−02 | 3.7856E−02 |
| A6 = | 1.2079E−01 | −3.5693E−02 | 4.4871E−02 | 2.9363E−02 | −1.9039E−01 | −1.3197E−01 |
| A8 = | −2.3026E+00 | −1.0377E−01 | −5.1482E−02 | −1.9123E−02 | 2.9714E−01 | 1.4794E−01 |
| A10 = | 8.5173E+00 | 5.7111E−01 | 2.4717E−02 | 1.7136E−02 | −2.3061E−01 | −8.3556E−02 |
| A12 = | −1.9502E+01 | −9.1688E−01 | −4.9364E−03 | −1.8808E−02 | 9.8259E−02 | 2.4955E−02 |
| A14 = | 2.4484E+01 | 9.0575E−01 | 4.3785E−04 | 1.1161E−02 | −2.1602E−02 | −3.1027E−03 |

TABLE 16-continued

| | | | Aspheric Coefficients | | |
|---|---|---|---|---|---|
| A16 = | −1.2168E+01 | −3.9927E−01 | −3.6912E−05 | −2.9635E−03 | 1.5698E−03 | −2.7487E−04 |
| A18 = | — | — | — | 2.8632E−04 | 2.0734E−04 | 1.2887E−04 |
| A20 = | — | — | — | — | −3.2414E−05 | −1.1135E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 7.25 | f/f4 | −1.41 |
| Fno | 2.48 | |f2/f4| | 1.50 |
| HFOV [deg.] | 16.8 | |f/f3| + |f/f4| + |f/f5| + |f/f6| | 3.41 |
| Vdmin | 19.4 | EPD/ImgH | 1.33 |
| V5/V6 | 0.35 | ImgH/f | 0.30 |
| T45/T34 | 2.94 | TL/f | 0.83 |
| T56/CT6 | 0.07 | CT1/|SAG11| | 1.50 |
| (T23 − T34)/T45 | 0.33 | Y11/Y62 | 0.78 |
| f/R12 | −1.82 | Y11/Y32 | 1.92 |
| (R7 + R8)/(R7 − R8) | −0.02 | Y51/Y42 | 1.73 |
| (R10 − R11)/(R10 + R11) | 0.04 | Yc12/CT1 | 0.19 |
| (R11 + R12)/(R11 − R12) | −3.19 | | — |

9th Embodiment

Figure 17:
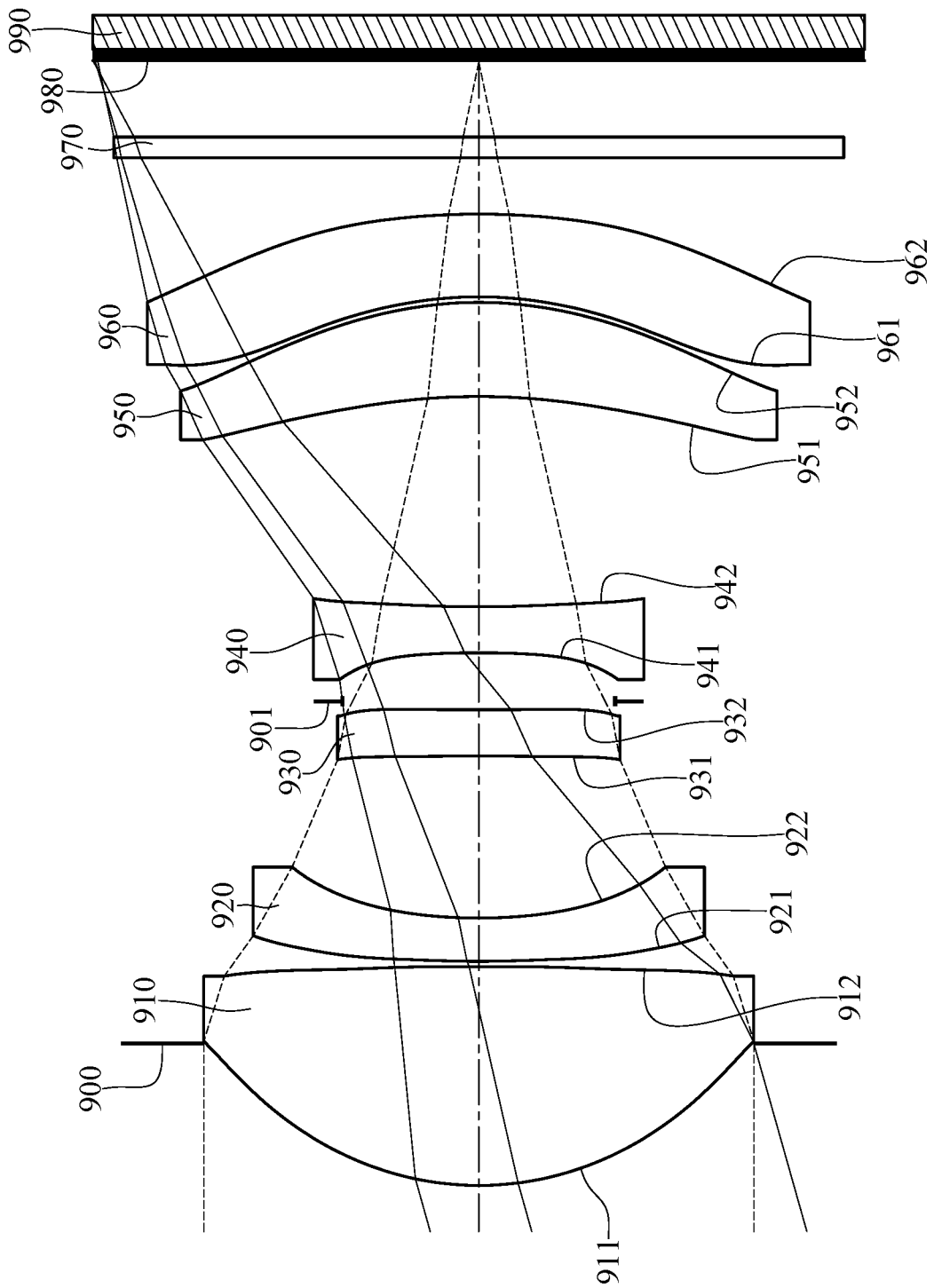
FIG. 17 is a schematic view of an image capturing unit according to the 9th embodiment of the present disclosure.
Figure 18:
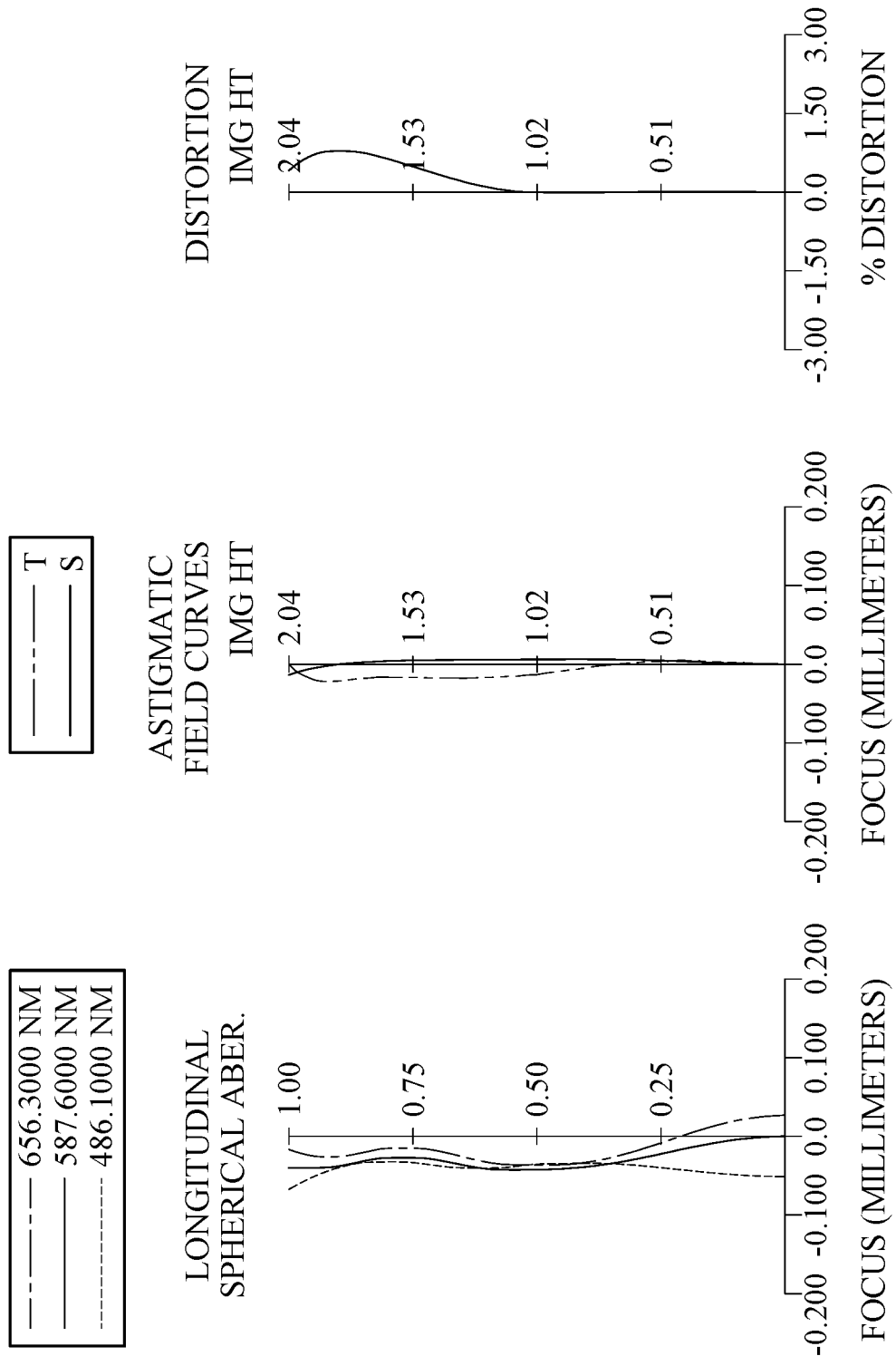
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens assembly (its reference numeral is omitted) of the present disclosure and an image sensor 990. The photographing optical lens assembly includes, in order from an object side to an image side, an aperture stop 900, a first lens element 910, a second lens element 920, a third lens element 930, a stop 901, a fourth lens element 940, a fifth lens element 950, a sixth lens element 960, a filter 970 and an image surface 980. The photographing optical lens assembly includes six lens elements (910, 920, 930, 940, 950 and 960) with no additional lens element disposed between each of the adjacent six lens elements, wherein there is an air gap between each of all adjacent lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one inflection point. The image-side surface 912 of the first lens element 910 has at least one inflection point. The image-side surface 912 of the first lens element 910 has at least one critical point in an off-axis region thereof.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point. The image-side surface 932 of the third lens element 930 has at least one inflection point.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has at least one inflection point. The image-side surface 952 of the fifth lens element 950 has at least one inflection point.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point.

The filter 970 is made of glass material and located between the sixth lens element 960 and the image surface 980, and will not affect the focal length of the photographing optical lens assembly. The image sensor 990 is disposed on or near the image surface 980 of the photographing optical lens assembly.

The detailed optical data of the 9th embodiment are shown in Table 17 and the aspheric surface data are shown in Table 18 below.

TABLE 17

9th Embodiment
f = 7.25 mm, Fno = 2.48, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.755 | | | | |
| 2 | Lens 1 | 1.630 | (ASP) | 1.163 | Plastic | 1.545 | 56.1 | 3.23 |
| 3 | | 16.374 | (ASP) | 0.030 | | | | |
| 4 | Lens 2 | 5.331 | (ASP) | 0.230 | Plastic | 1.669 | 19.4 | −8.85 |
| 5 | | 2.756 | (ASP) | 0.863 | | | | |
| 6 | Lens 3 | −13.274 | (ASP) | 0.246 | Plastic | 1.534 | 55.9 | −19.30 |
| 7 | | 46.302 | (ASP) | 0.045 | | | | |
| 8 | Stop | Plano | | 0.258 | | | | |
| 9 | Lens 4 | −5.992 | (ASP) | 0.245 | Plastic | 1.544 | 56.0 | −5.85 |
| 10 | | 6.889 | (ASP) | 1.119 | | | | |
| 11 | Lens 5 | −3.530 | (ASP) | 0.501 | Plastic | 1.669 | 19.4 | 6.83 |
| 12 | | −2.104 | (ASP) | 0.030 | | | | |
| 13 | Lens 6 | −2.003 | (ASP) | 0.440 | Plastic | 1.544 | 56.0 | −8.20 |
| 14 | | −3.916 | (ASP) | 0.300 | | | | |
| 15 | Filter | Plano | | 0.110 | Glass | 1.517 | 64.2 | — |
| 16 | | Plano | | 0.407 | | | | |
| 17 | Image | Plano | | — | | | | |

Note:
Reference wavelength is 587.6 nm (d-line).
An effective radius of the stop 901 (Surface 8) is 0.725 mm.

TABLE 18

Aspheric Coefficients

| Surface # | 2 | 3 | 4 | 5 | 6 | 7 |
|---|---|---|---|---|---|---|
| k = | −3.4750E−01 | 0.0000E+00 | 0.0000E+00 | 0.0000E+00 | 1.9650E+01 | 0.0000E+00 |
| A4 = | 3.1260E−03 | −3.8267E−01 | −3.1060E−01 | 3.6846E−02 | 1.5364E−01 | 1.0537E−01 |
| A6 = | 3.7833E−03 | 1.0100E+00 | 8.4018E−01 | 9.1386E−02 | −3.1770E−01 | −6.0740E−01 |
| A8 = | −1.1662E−02 | −1.3290E+00 | −8.2095E−01 | 3.5128E−02 | 2.0777E−01 | 8.5080E−01 |
| A10 = | 1.6620E−02 | 9.8962E−01 | 1.4867E−01 | −6.9158E−02 | −3.0480E−01 | −2.4632E+00 |
| A12 = | −1.1130E−02 | −4.2783E−01 | 2.8832E−01 | −3.4770E−01 | 2.2207E−01 | 4.4470E+00 |
| A14 = | 3.7616E−03 | 1.0040E−01 | −1.9903E−01 | 5.8108E−01 | 3.6919E−01 | −3.8894E+00 |
| A16 = | −6.0436E−04 | −9.9487E−03 | 3.9430E−02 | −2.3777E−01 | −7.7589E−01 | 1.1651E+00 |

| Surface # | 9 | 10 | 11 | 12 | 13 | 14 |
|---|---|---|---|---|---|---|
| k = | 0.0000E+00 | 0.0000E+00 | 0.0000E+00 | 0.0000E+00 | 0.0000E+00 | 0.0000E+00 |
| A4 = | −1.7514E−01 | −3.4163E−02 | −1.2610E−02 | 3.5284E−02 | 1.3594E−01 | 3.5264E−02 |
| A6 = | −1.0816E−01 | −4.4780E−02 | 1.2490E−02 | 1.7237E−02 | −2.4690E−01 | −1.4056E−01 |
| A8 = | −2.2784E+00 | −4.6149E−01 | −1.9729E−01 | −8.0854E−02 | 2.2373E−01 | 1.5149E−01 |
| A10 = | 1.0821E+01 | 2.5037E+00 | 1.7295E−01 | 1.1736E−01 | −4.3399E−02 | −8.3420E−02 |
| A12 = | −2.6370E+01 | −4.7987E+00 | −9.5090E−02 | −8.5362E−02 | −5.7799E−02 | 2.4974E−02 |
| A14 = | 3.3617E+01 | 4.6545E+00 | 3.4377E−02 | 3.5546E−02 | 4.8393E−02 | −3.1182E−03 |
| A16 = | −1.7257E+01 | −1.9070E+00 | −8.3529E−03 | −8.6693E−03 | −1.6738E−02 | −2.8027E−04 |
| A18 = | — | −1.3824E−01 | 1.3384E−03 | 1.1862E−03 | 2.8650E−03 | 1.2762E−04 |
| A20 = | — | 2.0355E−01 | −1.1004E−04 | −7.3237E−05 | −1.9920E−04 | −1.0722E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 7.25 | f/f4 | −1.24 |
| Fno | 2.48 | |f2/f4| | 1.51 |
| HFOV [deg.] | 15.7 | |f/f3| + |f/f4| + |f/f5| + |f/f6| | 3.56 |
| Vdmin | 19.4 | EPD/ImgH | 1.43 |
| V5/V6 | 0.35 | ImgH/f | 0.28 |
| T45/T34 | 3.69 | TL/f | 0.83 |
| T56/CT6 | 0.07 | CT1/|SAG11| | 1.52 |

-continued

| 9th Embodiment | | | |
|---|---|---|---|
| (T23 − T34)/T45 | 0.50 | Y11/Y62 | 0.83 |
| f/R12 | −1.85 | Y11/Y32 | 1.99 |
| (R7 + R8)/(R7 − R8) | −0.07 | Y51/Y42 | 1.67 |
| (R10 − R11)/(R10 + R11) | 0.02 | Yc12/CT1 | 0.19 |
| (R11 + R12)/(R11 − R12) | −3.09 | — | — |

10th Embodiment

Figure 19:
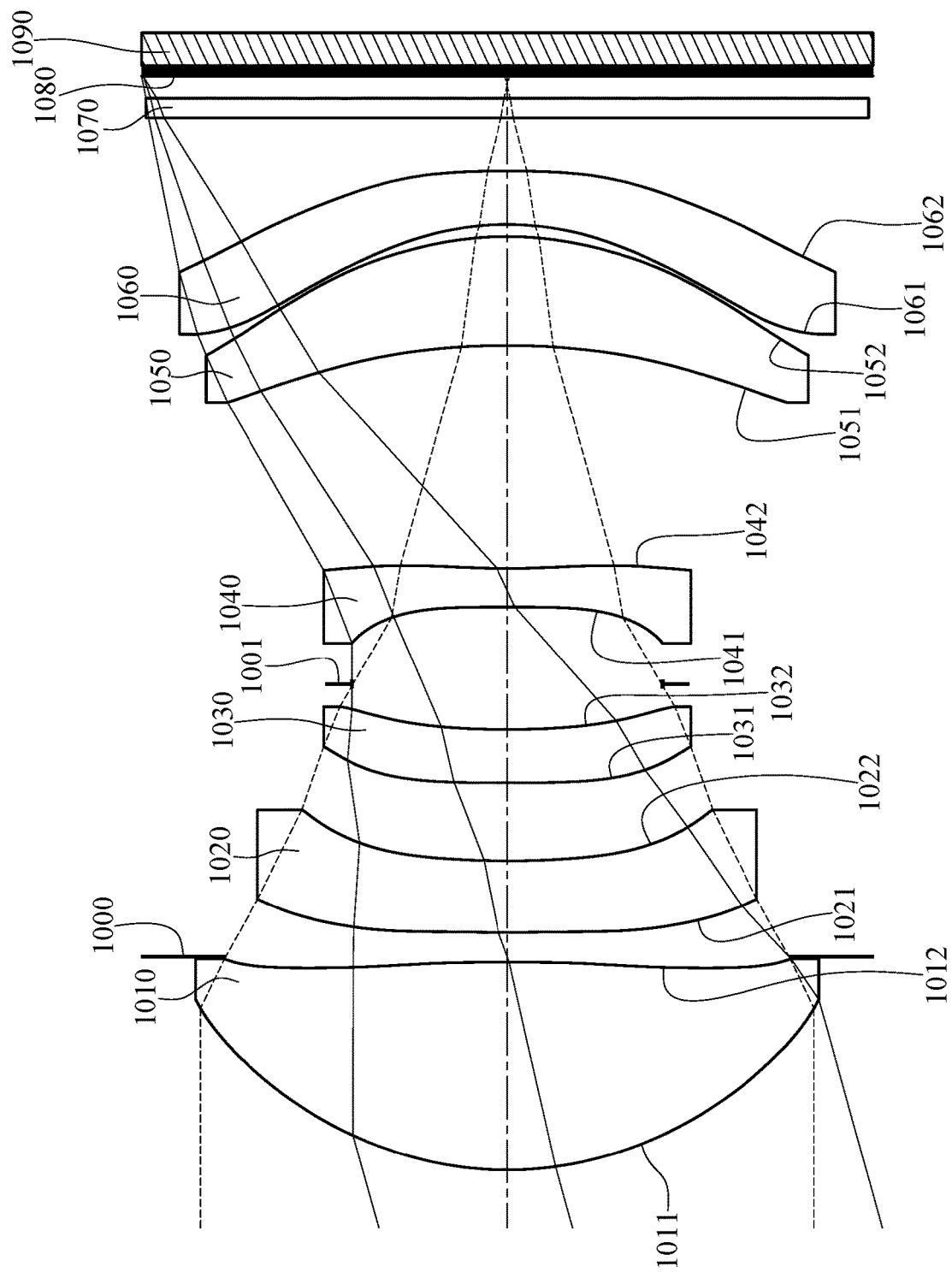
FIG. 19 is a schematic view of an image capturing unit according to the 10th embodiment of the present disclosure.
Figure 20:
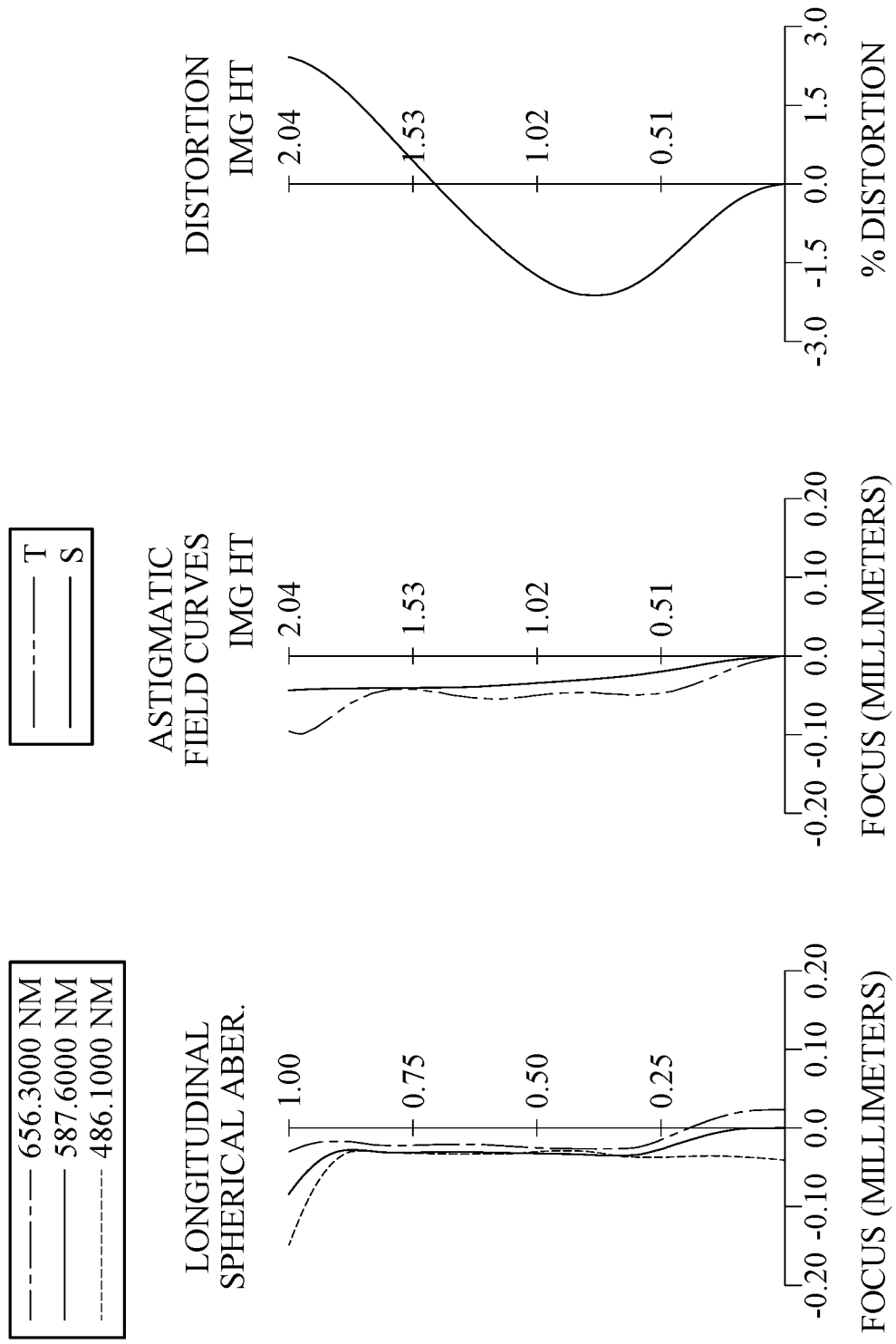
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens assembly (its reference numeral is omitted) of the present disclosure and an image sensor 1090. The photographing optical lens assembly includes, in order from an object side to an image side, a first lens element 1010, an aperture stop 1000, a second lens element 1020, a third lens element 1030, a stop 1001, a fourth lens element 1040, a fifth lens element 1050, a sixth lens element 1060, a filter 1070 and an image surface 1080. The photographing optical lens assembly includes six lens elements (1010, 1020, 1030, 1040, 1050 and 1060) with no additional lens element disposed between each of the adjacent six lens elements, wherein there is an air gap between each of all adjacent lens elements.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric. The image-side surface 1012 of the first lens element 1010 has at least one inflection point. The image-side surface 1012 of the first lens element 1010 has at least one critical point in an off-axis region thereof.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has at least one inflection point. The image-side surface 1022 of the second lens element 1020 has at least one inflection point.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has at least one inflection point. The image-side surface 1032 of the third lens element 1030 has at least one inflection point.

The fourth lens element 1040 with negative refractive power has an object-side surface 1041 being concave in a paraxial region thereof and an image-side surface 1042 being concave in a paraxial region thereof. The fourth lens element 1040 is made of plastic material and has the object-side surface 1041 and the image-side surface 1042 being both aspheric. The image-side surface 1042 of the fourth lens element 1040 has at least one inflection point.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has at least one inflection point. The image-side surface 1052 of the fifth lens element 1050 has at least one inflection point.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1062 of the sixth lens element 1060 has at least one inflection point.

The filter 1070 is made of glass material and located between the sixth lens element 1060 and the image surface 1080, and will not affect the focal length of the photographing optical lens assembly. The image sensor 1090 is disposed on or near the image surface 1080 of the photographing optical lens assembly.

The detailed optical data of the 10th embodiment are shown in Table 19 and the aspheric surface data are shown in Table 20 below.

TABLE 19

10th Embodiment
f = 7.22 mm, Fno = 2.10, HFOV = 15.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.986 | (ASP) | 1.165 | Plastic | 1.544 | 56.0 | 3.46 |
| 2 | | −27.944 | (ASP) | 0.031 | | | | |
| 3 | Ape. Stop | Plano | | 0.136 | | | | |
| 4 | Lens 2 | 8.774 | (ASP) | 0.402 | Plastic | 1.730 | 16.5 | −11.78 |
| 5 | | 4.259 | (ASP) | 0.438 | | | | |
| 6 | Lens 3 | 15.572 | (ASP) | 0.300 | Plastic | 1.534 | 55.9 | −13.48 |
| 7 | | 4.888 | (ASP) | 0.253 | | | | |
| 8 | Stop | Plano | | 0.435 | | | | |
| 9 | Lens 4 | −42.927 | (ASP) | 0.216 | Plastic | 1.562 | 44.6 | −6.87 |
| 10 | | 4.249 | (ASP) | 1.250 | | | | |
| 11 | Lens 5 | −4.290 | (ASP) | 0.611 | Plastic | 1.700 | 17.5 | 4.59 |
| 12 | | −1.944 | (ASP) | 0.067 | | | | |

TABLE 19-continued

10th Embodiment
f = 7.22 mm, Fno = 2.10, HFOV = 15.5 deg.

| Surface # | | Curvature Radius | | Thickness | Material | Index | Abbe # | Focal Length |
|---|---|---|---|---|---|---|---|---|
| 13 | Lens 6 | −1.669 | (ASP) | 0.301 | Plastic | 1.544 | 56.0 | −4.05 |
| 14 | | −7.318 | (ASP) | 0.300 | | | | |
| 15 | Filter | Plano | | 0.110 | Glass | 1.517 | 64.2 | — |
| 16 | | Plano | | 0.123 | | | | |
| 17 | Image | Plano | | — | | | | |

Note:
Reference wavelength is 587.6 nm (d-line).
An effective radius of the stop 1001 (Surface 8) is 0.870 mm.

TABLE 20

Aspheric Coefficients

| | Surface # | | | | | |
|---|---|---|---|---|---|---|
| | 1 | 2 | 4 | 5 | 6 | 7 |
| k = | −5.1086E−01 | −6.2184E+01 | −3.6341E+01 | −5.9970E+00 | 9.0000E+01 | 2.3895E+01 |
| A4 = | 3.0102E−03 | −1.8996E−01 | −2.9766E−01 | −1.7629E−01 | 7.9350E−03 | −3.4687E−02 |
| A6 = | −1.2586E−02 | 4.6833E−01 | 9.2461E−01 | 8.3450E−01 | 7.8400E−01 | 6.3513E−01 |
| A8 = | 2.4183E−02 | −5.2736E−01 | −1.2345E+00 | −1.2359E+00 | −1.9906E+00 | −2.0849E+00 |
| A10 = | −2.0150E−02 | 3.3986E−01 | 9.3879E−01 | 1.0434E+00 | 3.0500E+00 | 3.7413E+00 |
| A12 = | 9.2612E−03 | −1.2896E−01 | −4.2318E−01 | −5.8319E−01 | −3.0115E+00 | −4.3311E+00 |
| A14 = | −2.3133E−03 | 2.7007E−02 | 1.0784E−01 | 2.5056E−01 | 1.8159E+00 | 3.0319E+00 |
| A16 = | 2.5038E−04 | −2.4001E−03 | −1.2187E−02 | −6.0974E−02 | −5.0509E−01 | −1.0332E+00 |

| | Surface # | | | | | |
|---|---|---|---|---|---|---|
| | 9 | 10 | 11 | 12 | 13 | 14 |
| k = | 8.7811E+00 | −5.0308E+01 | 1.8756E+00 | −1.3816E−01 | −4.3973E−01 | −8.7666E+01 |
| A4 = | −2.8425E−01 | −1.7945E−01 | −4.3067E−02 | 3.6442E−02 | 1.2386E−02 | −2.6591E−01 |
| A6 = | −7.4367E−01 | 3.6752E−02 | 1.5375E−01 | 6.7557E−03 | −1.3948E−01 | 1.6111E−01 |
| A8 = | 5.7199E+00 | 2.5207E−01 | −3.6269E−01 | −5.3105E−02 | 4.4743E−01 | 7.6039E−02 |
| A10 = | −2.2803E+01 | −1.3105E−01 | 4.6506E−01 | 5.0161E−02 | −5.4851E−01 | −1.7480E−01 |
| A12 = | 5.4359E+01 | −1.1097E+00 | −3.4344E−01 | −1.9545E−02 | 3.6308E−01 | 1.1676E−01 |
| A14 = | −7.7845E+01 | 2.7998E+00 | 1.5341E−01 | 3.5069E−03 | −1.4025E−01 | −4.1650E−02 |
| A16 = | 6.1365E+01 | −2.9645E+00 | −4.1326E−02 | −2.3098E−04 | 3.1726E−02 | 8.5191E−03 |
| A18 = | −2.0551E+01 | 1.5165E+00 | 6.2312E−03 | — | −3.9038E−03 | −9.4057E−04 |
| A20 = | — | −3.0867E−01 | −4.0636E−04 | — | 2.0181E−04 | 4.3229E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 7.22 | f/f4 | −1.05 |
| Fno | 2.10 | \|f2/f4\| | 1.71 |
| HFOV [deg.] | 15.5 | \|f/f3\| + \|f/f4\| + \|f/f5\| + \|f/f6\| | 4.95 |
| Vdmin | 16.5 | EPD/ImgH | 1.69 |
| V5/V6 | 0.31 | ImgH/f | 0.28 |
| T45/T34 | 1.82 | TL/f | 0.85 |
| T56/CT6 | 0.22 | CT1/\|SAG11\| | 1.22 |
| (T23 − T34)/T45 | −0.20 | Y11/Y62 | 0.95 |
| f/R12 | −0.99 | Y11/Y32 | 1.86 |
| (R7 + R8)/(R7 − R8) | 0.82 | Y51/Y42 | 1.53 |

-continued

| 10th Embodiment | | | |
|---|---|---|---|
| (R10 − R11)/(R10 + R11) | 0.08 | Yc12/CT1 | 0.96 |
| (R11 + R12)/(R11 − R12) | −1.59 | — | — |

11th Embodiment

Figure 21:
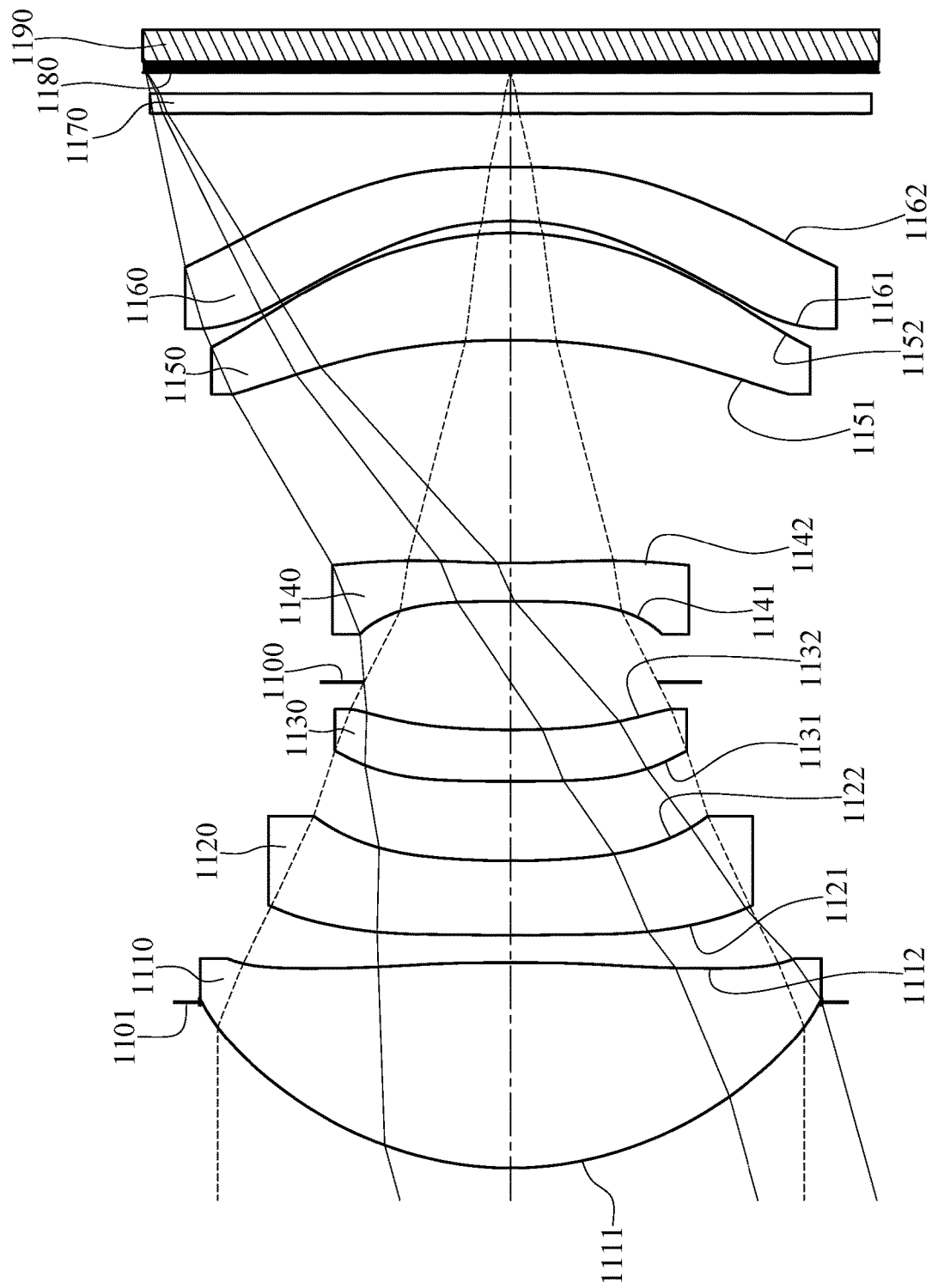
FIG. 21 is a schematic view of an image capturing unit according to the 11th embodiment of the present disclosure.
Figure 22:
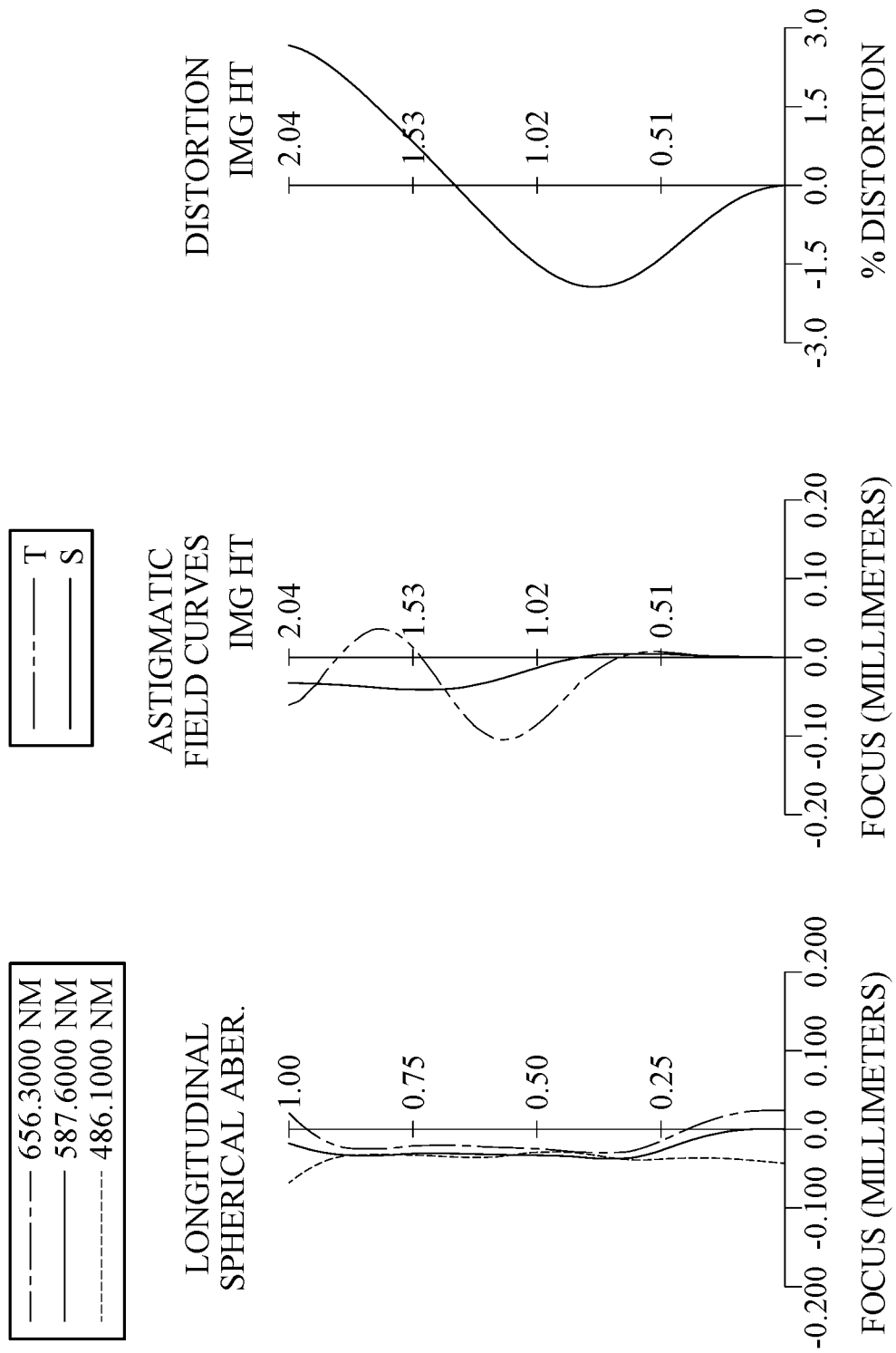
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the photographing optical lens assembly (its reference numeral is omitted) of the present disclosure and an image sensor 1190. The photographing optical lens assembly includes, in order from an object side to an image side, a stop 1101, a first lens element 1110, a second lens element 1120, a third lens element 1130, an aperture stop 1100, a fourth lens element 1140, a fifth lens element 1150, a sixth lens element 1160, a filter 1170 and an image surface 1180. The photographing optical lens assembly includes six lens elements (1110, 1120, 1130, 1140, 1150 and 1160) with no additional lens element disposed between each of the adjacent six lens elements, wherein there is an air gap between each of all adjacent lens elements.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric. The image-side surface 1112 of the first lens element 1110 has at least one inflection point. The image-side surface 1112 of the first lens element 1110 has at least one critical point in an off-axis region thereof.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric. The object-side surface 1121 of the second lens element 1120 has at least one inflection point. The image-side surface 1122 of the second lens element 1120 has at least one inflection point.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric. The object-side surface 1131 of the third lens element 1130 has at least one inflection point. The image-side surface 1132 of the third lens element 1130 has at least one inflection point.

The fourth lens element 1140 with negative refractive power has an object-side surface 1141 being concave in a paraxial region thereof and an image-side surface 1142 being concave in a paraxial region thereof. The fourth lens element 1140 is made of plastic material and has the object-side surface 1141 and the image-side surface 1142 being both aspheric. The image-side surface 1142 of the fourth lens element 1140 has at least one inflection point.

The fifth lens element 1150 with positive refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric. The object-side surface 1151 of the fifth lens element 1150 has at least one inflection point. The image-side surface 1152 of the fifth lens element 1150 has at least one inflection point.

The sixth lens element 1160 with negative refractive power has an object-side surface 1161 being concave in a paraxial region thereof and an image-side surface 1162 being convex in a paraxial region thereof. The sixth lens element 1160 is made of plastic material and has the object-side surface 1161 and the image-side surface 1162 being both aspheric. The object-side surface 1161 of the sixth lens element 1160 has at least one inflection point. The image-side surface 1162 of the sixth lens element 1160 has at least one inflection point.

The filter 1170 is made of glass material and located between the sixth lens element 1160 and the image surface 1180, and will not affect the focal length of the photographing optical lens assembly. The image sensor 1190 is disposed on or near the image surface 1180 of the photographing optical lens assembly.

The detailed optical data of the 11th embodiment are shown in Table 21 and the aspheric surface data are shown in Table 22 below.

TABLE 21

11th Embodiment
f = 7.23 mm, Fno = 2.20, HFOV = 15.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.930 | | | | |
| 2 | Lens 1 | 2.000 (ASP) | 1.152 | Plastic | 1.544 | 56.0 | 3.47 |
| 3 | | −26.104 (ASP) | 0.152 | | | | |
| 4 | Lens 2 | 8.549 (ASP) | 0.417 | Plastic | 1.730 | 16.5 | −12.39 |
| 5 | | 4.304 (ASP) | 0.447 | | | | |
| 6 | Lens 3 | 16.654 (ASP) | 0.288 | Plastic | 1.534 | 55.9 | −12.79 |
| 7 | | 4.814 (ASP) | 0.266 | | | | |
| 8 | Ape. Stop | Plano | 0.451 | | | | |
| 9 | Lens 4 | −24.528 (ASP) | 0.215 | Plastic | 1.562 | 44.6 | −6.94 |
| 10 | | 4.652 (ASP) | 1.250 | | | | |
| 11 | Lens 5 | −4.318 (ASP) | 0.602 | Plastic | 1.700 | 17.5 | 4.56 |
| 12 | | −1.940 (ASP) | 0.067 | | | | |
| 13 | Lens 6 | −1.671 (ASP) | 0.302 | Plastic | 1.544 | 56.0 | −3.99 |
| 14 | | −7.754 (ASP) | 0.300 | | | | |
| 15 | Filter | Plano | 0.110 | Glass | 1.517 | 64.2 | — |
| 16 | | Plano | 0.119 | | | | |
| 17 | Image | Plano | — | | | | |

Note:
Reference wavelength is 587.6 nm (d-line).
An effective radius of the stop 1101 (Surface 1) is 1.740 mm.

TABLE 22

Aspheric Coefficients

| Surface # | 2 | 3 | 4 | 5 | 6 | 7 |
|---|---|---|---|---|---|---|
| k = | −5.0509E−01 | −6.2184E+01 | −3.6341E+01 | −5.9970E+00 | 9.0000E+01 | 2.4713E+01 |
| A4 = | 2.9008E−03 | −2.0984E−01 | −3.0687E−01 | −1.6596E−01 | 3.7368E−02 | −1.8405E−02 |
| A6 = | −1.2843E−02 | 5.3544E−01 | 9.6174E−01 | 7.9646E−01 | 6.1545E−01 | 5.2781E−01 |
| A8 = | 2.5290E−02 | −6.2150E−01 | −1.3013E+00 | −1.1686E+00 | −1.3881E+00 | −1.7724E+00 |
| A10 = | −2.1001E−02 | 4.1052E−01 | 1.0005E+00 | 9.4620E−01 | 1.7744E+00 | 3.1928E+00 |
| A12 = | 9.5291E−03 | −1.5909E−01 | −4.5394E−01 | −4.7160E−01 | −1.4444E+00 | −3.8154E+00 |
| A14 = | −2.3662E−03 | 3.3973E−02 | 1.1600E−01 | 1.8434E−01 | 8.0944E−01 | 2.8197E+00 |
| A16 = | 2.5915E−04 | −3.0791E−03 | −1.3145E−02 | −4.7852E−02 | −2.5936E−01 | −1.0664E+00 |

| Surface # | 9 | 10 | 11 | 12 | 13 | 14 |
|---|---|---|---|---|---|---|
| k = | 8.7811E+00 | −5.0308E+01 | 1.8756E+00 | −1.4671E−01 | −4.4428E−01 | −8.7666E+01 |
| A4 = | −2.7294E−01 | −1.8692E−01 | −5.3663E−02 | 2.9067E−02 | 1.2749E−02 | −2.6562E−01 |
| A6 = | −7.9169E−01 | 4.6996E−02 | 1.9609E−01 | 2.5770E−02 | −1.4966E−01 | 1.5989E−01 |
| A8 = | 6.0213E+00 | 2.6977E−01 | −4.4883E−01 | −7.3801E−02 | 4.7070E−01 | 7.5597E−02 |
| A10 = | −2.4241E+01 | −1.7050E−01 | 5.7175E−01 | 6.3523E−02 | −5.7412E−01 | −1.7284E−01 |
| A12 = | 5.8894E+01 | −1.1885E+00 | −4.2706E−01 | −2.4589E−02 | 3.8028E−01 | 1.1509E−01 |
| A14 = | −8.6598E+01 | 3.1384E+00 | 1.9528E−01 | 4.5425E−03 | −1.4763E−01 | −4.0905E−02 |
| A16 = | 7.0511E+01 | −3.4179E+00 | −5.4253E−02 | −3.2022E−04 | 3.3676E−02 | 8.3234E−03 |
| A18 = | −2.4519E+01 | 1.7921E+00 | 8.4616E−03 | — | −4.1905E−03 | −9.1178E−04 |
| A20 = | — | −3.7365E−01 | −5.7033E−04 | — | 2.1965E−04 | 4.1417E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 7.23 | f/f4 | −1.04 |
| Fno | 2.20 | |f2/f4| | 1.78 |
| HFOV [deg.] | 15.5 | |f/f3| + |f/f4| + |f/f5| + |f/f6| | 5.00 |
| Vdmin | 16.5 | EPD/ImgH | 1.61 |
| V5/V6 | 0.31 | ImgH/f | 0.28 |
| T45/T34 | 1.74 | TL/f | 0.85 |
| T56/CT6 | 0.22 | CT1/|SAG11| | 1.22 |
| (T23 − T34)/T45 | −0.22 | Y11/Y62 | 0.95 |
| f/R12 | −0.93 | Y11/Y32 | 1.94 |
| (R7 + R8)/(R7 − R8) | 0.68 | Y51/Y42 | 1.56 |
| (R10 − R11)/(R10 + R11) | 0.07 | Yc12/CT1 | 0.98 |
| (R11 + R12)/(R11 − R12) | −1.55 | — | — |

12th Embodiment

Figure 23:
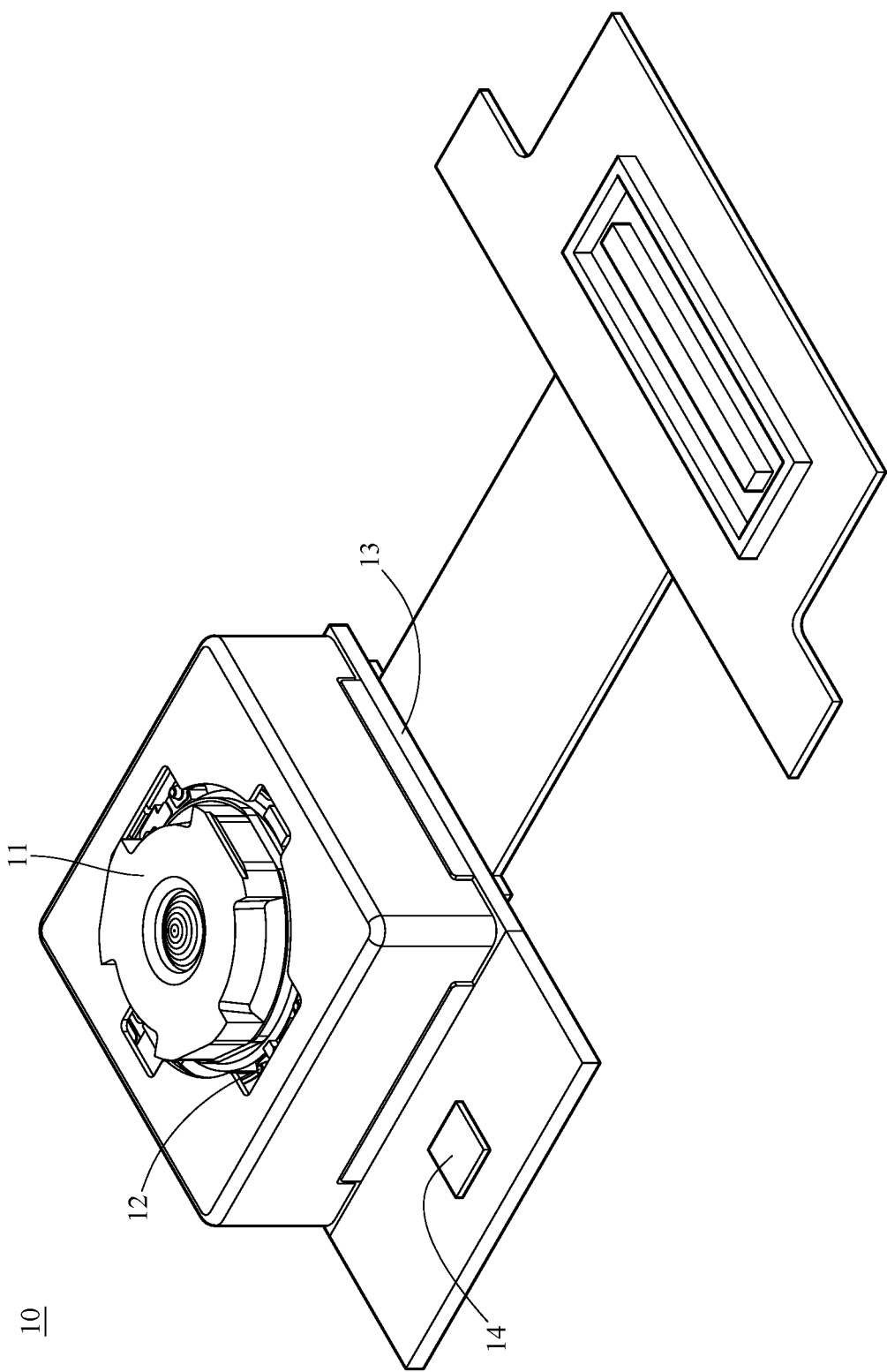
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the photographing optical lens assembly disclosed in the 1st embodiment, a barrel and a holder member (their reference numerals are omitted) for holding the photographing optical lens assembly; the lens unit 11 may include the photographing optical lens assembly disclosed in the other embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
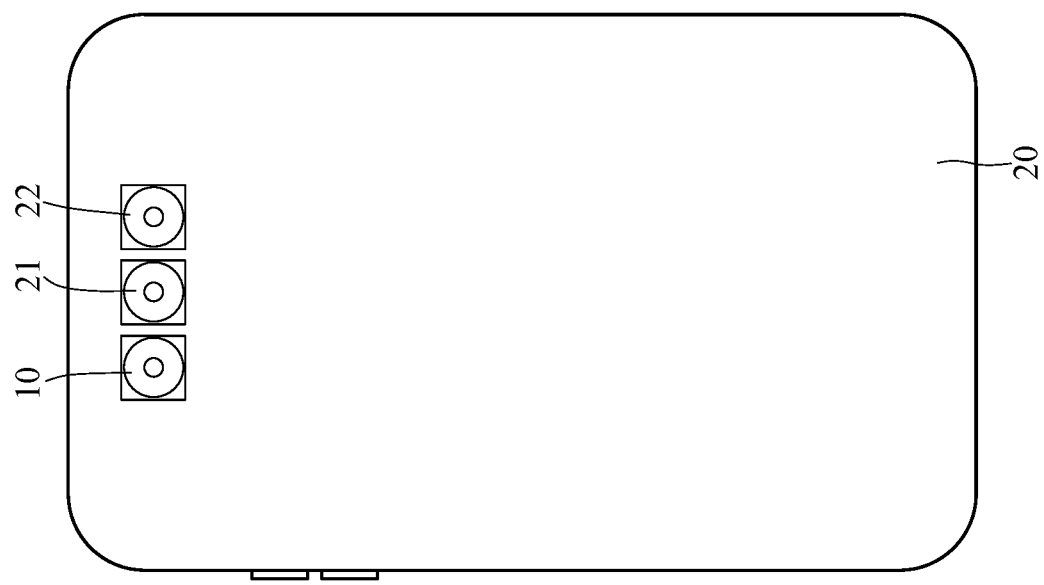
FIG. 24 is one perspective view of an electronic device according to the 13th embodiment of the present disclosure.
Figure 25:
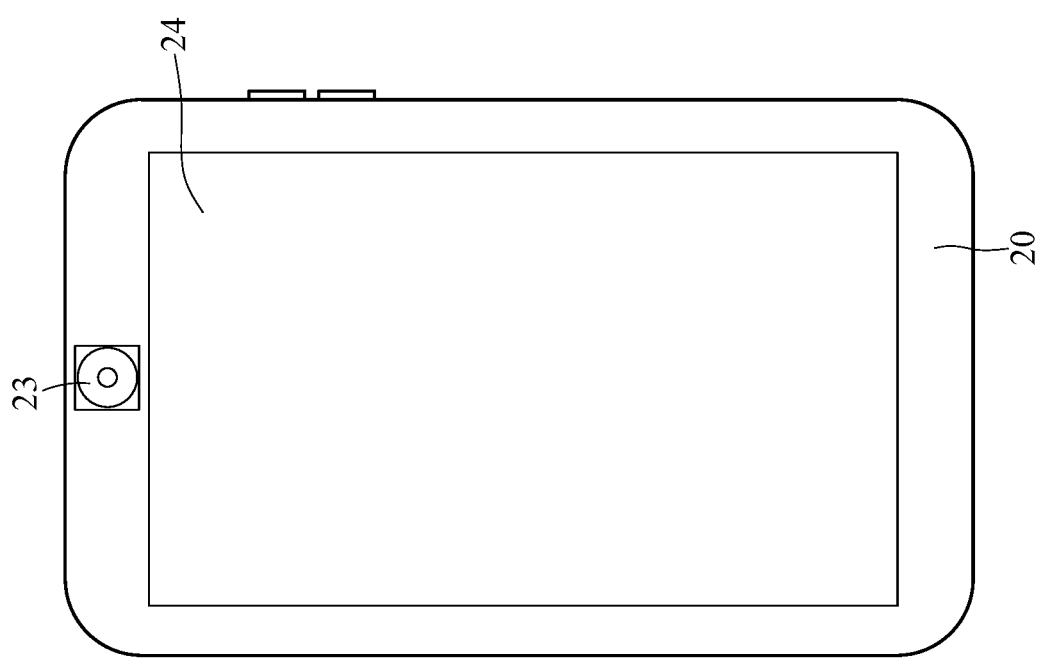
FIG. 25 is another perspective view of the electronic device in FIG. 24.

FIG. 24 is one perspective view of an electronic device according to the 13th embodiment of the present disclosure. FIG. 25 is another perspective view of the electronic device in FIG. 24.

In this embodiment, an electronic device 20 is a smartphone including the image capturing unit 10 disclosed in the 12th embodiment, an image capturing unit 21, an image capturing unit 22, an image capturing unit 23 and a display unit 24.

In this embodiment, the image capturing unit 10, the image capturing unit 21 and the image capturing unit 22 are disposed on the same side of the electronic device 20, while the image capturing unit 23 and the display unit 24 are disposed on the opposite side of the electronic device 20. The image capturing unit 23 is a front-facing camera of the electronic device 20 for taking selfies, but the present disclosure is not limited thereto. Furthermore, each of the image capturing unit 21, the image capturing unit 22 and the image capturing unit 23 has a configuration similar to that of the image capturing unit 10. In detail, each of the image capturing unit 21, the image capturing unit 22 and the image capturing unit 23 includes a lens unit, a driving device, an image sensor and an image stabilizer, the lens unit includes an optical lens assembly, a barrel and a holder member for holding the optical lens assembly, and the image sensor is disposed on an image surface of the optical lens assembly.

In this embodiment, the image capturing unit 10 is a telephoto image capturing unit, the image capturing unit 21 is a wide-angle image capturing unit, and the image capturing unit 22 is an ultra-wide-angle image capturing unit; wherein the maximum field of view of the image capturing unit 10 and the maximum field of view of the image capturing unit 21 can differ by at least 35 degrees, or the maximum field of view of the image capturing unit 10 and the maximum field of view of the image capturing unit 22 can differ by at least 35 degrees. Therefore, the image capturing units 10, 21 and 22 have different fields of view, such that the electronic device 20 has various magnification ratios so as to meet the requirements of optical zoom functionality and various applications. In this embodiment, the electronic device 20 includes multiple image capturing units 10, 21 and 22, but the present disclosure is not limited to the number and arrangement of image capturing units.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has negative refractive power, the third lens element has negative refractive power, the fourth lens element has negative refractive power, the fifth lens element has positive refractive power, the sixth lens element has negative refractive power, and an axial distance between the fourth lens element and the fifth lens element is larger than an axial distance between the fifth lens element and the sixth lens element;

wherein half of a maximum field of view of the photographing optical lens assembly is HFOV, a focal length of the photographing optical lens assembly is f, a focal length of the third lens element is f3, a focal length of the fourth lens element is f4, a focal length of the fifth lens element is f5, a focal length of the sixth lens element is f6, the axial distance between the fifth lens element and the sixth lens element is T56, a central thickness of the sixth lens element is CT6, and the following conditions are satisfied:

5.0[deg.]<HFOV<25.0[deg.];

−3.0<f/f4<−0.80;

3.0<|f/f3|+|f/f4|+|f/f5|+|f/f6|<8.0; and

0<T56/CT6<0.62.

2. The photographing optical lens assembly of claim 1, wherein the object-side surface of the fourth lens element is concave in a paraxial region thereof.

3. The photographing optical lens assembly of claim 1, wherein a focal length of the second lens element is f2, the focal length of the fourth lens element is f4, and the following condition is satisfied:

0.95<|f2/f4|<3.0.

4. The photographing optical lens assembly of claim 1, wherein an axial distance between the object-side surface of the first lens element and an image surface is TL, the focal length of the photographing optical lens assembly is f, and the following condition is satisfied:

0.30<TL/f<0.90.

5. The photographing optical lens assembly of claim 1, wherein a curvature radius of the object-side surface of the fourth lens element is R7, a curvature radius of the image-side surface of the fourth lens element is R8, and the following condition is satisfied:

−1.50<(R7+R8)/(R7−R8)<1.0.

6. The photographing optical lens assembly of claim 1, wherein a curvature radius of the object-side surface of the sixth lens element is R11, a curvature radius of the image-side surface of the sixth lens element is R12, and the following condition is satisfied:

−5.0<(R11+R12)/(R11−R12)<−2.0.

7. The photographing optical lens assembly of claim 1, wherein a maximum effective radius of the object-side surface of the first lens element is Y11, a maximum effective radius of the image-side surface of the third lens element is Y32, a maximum effective radius of the image-side surface of the fourth lens element is Y42, a maximum effective radius of the object-side surface of the fifth lens element is Y51, and the following conditions are satisfied:

$1.50 < Y11/Y32 < 2.50$; and $1.40 < Y51/Y42 < 2.0$.

8. The photographing optical lens assembly of claim 1, wherein an Abbe number of the fifth lens element is V5, an Abbe number of the sixth lens element is V6, an f-number of the photographing optical lens assembly is Fno, and the following conditions are satisfied:

$0.10 < V5/V6 < 0.55$; and $1.0 < Fno < 2.50$.

9. The photographing optical lens assembly of claim 1, wherein the axial distance between the fourth lens element and the fifth lens element is a maximum among axial distances between each of all adjacent lens elements of the photographing optical lens assembly.

10. An electronic device, comprising at least two image capturing units disposed on a same side of the electronic device, and the at least two image capturing units comprising:
a first image capturing unit, comprising the photographing optical lens assembly of claim 1 and an image sensor disposed on an image surface of the photographing optical lens assembly; and
a second image capturing unit, comprising an optical lens assembly and an image sensor disposed on an image surface of the optical lens assembly;
wherein a maximum field of view of the first image capturing unit and a maximum field of view of the second image capturing unit differ by at least 35 degrees.

11. A photographing optical lens assembly comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the second lens element has negative refractive power, the third lens element has negative refractive power, the fourth lens element has negative refractive power, the fifth lens element has positive refractive power, the sixth lens element has negative refractive power, the object-side surface of the sixth lens element is concave in a paraxial region thereof, the image-side surface of the sixth lens element is convex in a paraxial region thereof, the sixth lens element is made of plastic material, at least one surface of at least one lens element of the photographing optical lens assembly has at least one inflection point, and an axial distance between the fourth lens element and the fifth lens element is a maximum among axial distances between each of all adjacent lens elements of the photographing optical lens assembly;
wherein half of a maximum field of view of the photographing optical lens assembly is HFOV, a focal length of the photographing optical lens assembly is f, a focal length of the fourth lens element is f4, and the following conditions are satisfied:

$5.0[\text{deg.}] < HFOV < 25.0[\text{deg.}]$; and $-3.0 < f/f4 < -0.80$.

12. The photographing optical lens assembly of claim 11, wherein the object-side surface of the fourth lens element is concave in a paraxial region thereof.

13. The photographing optical lens assembly of claim 11, wherein the object-side surface of the sixth lens element has at least one inflection point, and there is an air gap in a paraxial region between each of all adjacent lens elements of the photographing optical lens assembly.

14. The photographing optical lens assembly of claim 11, wherein a minimum value among Abbe numbers of all lens elements of the photographing optical lens assembly is Vdmin, and the following condition is satisfied:

$10.0 < Vdmin < 21.0$.

15. The photographing optical lens assembly of claim 11, wherein a maximum image height of the photographing optical lens assembly is ImgH, the focal length of the photographing optical lens assembly is f, and the following condition is satisfied:

$0.15 < ImgH/f < 0.33$.

16. The photographing optical lens assembly of claim 11, wherein a central thickness of the first lens element is CT1, a displacement in parallel with an optical axis from an axial vertex to a maximum effective radius position on the object-side surface of the first lens element is SAG11, and the following condition is satisfied:

$0.50 < CT1/|SAG11| < 1.80$.

17. The photographing optical lens assembly of claim 11, wherein the focal length of the photographing optical lens assembly is f, a curvature radius of the image-side surface of the sixth lens element is R12, and the following condition is satisfied:

$-3.0 < f/R12 < -1.10$.

18. The photographing optical lens assembly of claim 11, wherein a curvature radius of the image-side surface of the fifth lens element is R10, a curvature radius of the object-side surface of the sixth lens element is R11, and the following condition is satisfied:

$-0.15 < (R10-R11)/(R10+R11) < 0.15$.

19. The photographing optical lens assembly of claim 11, wherein an entrance pupil diameter of the photographing optical lens assembly is EPD, a maximum image height of the photographing optical lens assembly is ImgH, an axial distance between the third lens element and the fourth lens element is T34, the axial distance between the fourth lens element and the fifth lens element is T45, and the following conditions are satisfied:

$1.0 < EPD/ImgH < 3.0$; and $1.0 < T45/T34 < 7.0$.

20. The photographing optical lens assembly of claim 11, wherein a maximum effective radius of the object-side surface of the first lens element is Y11, a maximum effective radius of the image-side surface of the sixth lens element is Y62, and the following condition is satisfied:

$0.70 < Y11/Y62 < 1.20$.

21. A photographing optical lens assembly comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has negative refractive power, the third lens element has negative refractive power, the fourth lens element has negative refractive power, the fifth lens element has positive refractive power, the object-side surface of the fifth lens element is concave in a paraxial region thereof, the image-side surface of the fifth lens element is convex in a paraxial region thereof, the sixth lens element has negative refractive power, and an axial distance between the fourth lens element and the fifth lens element is a maximum among axial distances between each of all adjacent lens elements of the photographing optical lens assembly;

wherein half of a maximum field of view of the photographing optical lens assembly is HFOV, a focal length of the photographing optical lens assembly is f, a focal length of the fourth lens element is f4, and the following conditions are satisfied:

$5.0[\text{deg.}] < HFOV < 25.0[\text{deg.}]$; and $-3.0 < f/f4 < -0.80$.

22. The photographing optical lens assembly of claim 21, wherein the object-side surface of the second lens element is convex in a paraxial region thereof, and the image-side surface of the second lens element is concave in a paraxial region thereof.

23. The photographing optical lens assembly of claim 21, wherein the object-side surface of the third lens element is convex in a paraxial region thereof, the image-side surface of the third lens element is concave in a paraxial region thereof, a vertical distance between a non-axial critical point closest to an optical axis on the image-side surface of the first lens element and the optical axis is Yc12, a central thickness of the first lens element is CT1, and the following condition is satisfied:

$0.03 < Yc12/CT1 < 2.0$.

24. The photographing optical lens assembly of claim 21, wherein an axial distance between the object-side surface of the first lens element and an image surface is TL, the focal length of the photographing optical lens assembly is f, and the following condition is satisfied:

$0.30 < TL/f < 0.90$.

25. The photographing optical lens assembly of claim 21, wherein an axial distance between the second lens element and the third lens element is T23, an axial distance between the third lens element and the fourth lens element is T34, the axial distance between the fourth lens element and the fifth lens element is T45, and the following condition is satisfied:

$0.20 < (T23-T34)/T45 < 1.20$.

26. The photographing optical lens assembly of claim 21, wherein a central thickness of the first lens element is a maximum among central thicknesses of all lens elements of the photographing optical lens assembly.

\* \* \* \* \*